US 11,325,636 B2

(12) United States Patent
Imagaki et al.

(10) Patent No.: US 11,325,636 B2
(45) Date of Patent: May 10, 2022

(54) STEERING COLUMN DEVICE

(71) Applicant: JTEKT CORPORATION, Osaka (JP)

(72) Inventors: Susumu Imagaki, Tondabayashi (JP); Masayoshi Sakuda, Kashihara (JP); Takahiro Baito, Kosai (JP); Takuya Adachi, Toyohashi (JP); Kota Higuchi, Hamamatsu (JP); So Tanaka, Hamamatsu (JP); Kazuki Fujiwara, Toyohashi (JP); Kenji Utsunomiya, Toyohashi (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 17/170,992

(22) Filed: Feb. 9, 2021

(65) Prior Publication Data

US 2021/0253155 A1 Aug. 19, 2021

(30) Foreign Application Priority Data

Feb. 14, 2020 (JP) .............................. JP2020-023427
Feb. 14, 2020 (JP) .............................. JP2020-023428

(51) Int. Cl.
*B62D 1/184* (2006.01)
*B62D 1/19* (2006.01)
(52) U.S. Cl.
CPC .............. *B62D 1/184* (2013.01); *B62D 1/195* (2013.01)
(58) Field of Classification Search
CPC ......... B62D 1/184; B62D 1/195; B62D 1/192
See application file for complete search history.

(56) References Cited

U.S. PATENT DOCUMENTS

| 10,737,714 B2* | 8/2020 | Shiroishi ................ B62D 1/184 |
| 10,807,631 B2* | 10/2020 | Lingemann ............ B62D 1/184 |
| 11,040,737 B2* | 6/2021 | Strong ................... B62D 1/184 |
| 2003/0160440 A1* | 8/2003 | Kahlenberg ........... B62D 1/181 |
| | | 280/775 |
| 2012/0125140 A1 | 5/2012 | Ridgway et al. |

(Continued)

FOREIGN PATENT DOCUMENTS

| EP | 2 923 921 A1 | 9/2015 |
| EP | 3 072 779 A1 | 9/2016 |

(Continued)

OTHER PUBLICATIONS

Jun. 11, 2021 extended Search Report issued in European Patent Application No. 21156560.1.

*Primary Examiner* — Drew J Brown
(74) *Attorney, Agent, or Firm* — Oliff PLC

(57) ABSTRACT

A steering column device includes an inner tube, a housing, and a lock mechanism configured. The lock mechanism includes a first engagement member, a second engagement member, a first urging member, a second urging member, a cam member configured to rotate about a rotation axis extending in a direction in which the first urging member and the second urging member are arranged such that the second urging member serving as a follower is moved in the direction in which the first urging member and the second urging member are arranged to change a magnitude relationship between an urging force of the first urging member and an urging force of the second urging member, and an operation lever configured to operate the cam member.

8 Claims, 14 Drawing Sheets

(56) References Cited

U.S. PATENT DOCUMENTS

| | | | | |
|---|---|---|---|---|
| 2013/0118292 A1* | 5/2013 | Sulser | ............... | B62D 1/185 |
| | | | | 74/493 |
| 2015/0266497 A1 | 9/2015 | Yoshihara et al. | | |
| 2016/0159387 A1* | 6/2016 | Okano | ............... | B62D 1/184 |
| | | | | 74/493 |
| 2016/0280248 A1* | 9/2016 | Uesaka | ............... | B62D 1/195 |
| 2017/0274922 A1* | 9/2017 | Uesaka | ............... | B62D 1/185 |

FOREIGN PATENT DOCUMENTS

| | | |
|---|---|---|
| EP | 3 222 494 A2 | 9/2017 |
| EP | 3 287 340 A1 | 2/2018 |
| JP | 2015-182611 A | 10/2015 |

* cited by examiner

STEERING COLUMN DEVICE

CROSS-REFERENCE TO RELATED APPLICATION

This application claims priority to Japanese Patent Application No. 2020-023427 filed on Feb. 14, 2020 and Japanese Patent Application No. 2020-023428 filed on Feb. 14, 2020, each incorporated herein by reference in its entirety.

BACKGROUND

1. Technical Field

The disclosure relates to a steering column device related to steering of a vehicle.

2. Description of Related Art

A steering column device including an inner tube and a housing is conventionally known in the art. The inner tube holds a column shaft to which a steering member is connected such that the column shaft is rotatable. The housing is fixed to a vehicle and holds the inner tube such that the inner tube is slidable in the axial direction. Such a steering column device includes a plurality of teeth and a lock member (e.g., Japanese Unexamined Patent Application Publication No. 2015-182611 (JP 2015-182611 A)). The teeth are formed in the outer peripheral surface of the inner tube so as to be arranged in the axial direction. The lock member determines the position of the inner tube with respect to the housing by engaging with the tooth at a desired position.

SUMMARY

However, the conventional lock member engages with and disengaged from the tooth by rotating about a rotation axis extending in a direction perpendicular to the arrangement of the teeth. The lock member protrudes radially outward to a large extent from the inner tube. The attachment position and attachment attitude of the steering column device including the conventional lock member are therefore significantly limited.

There is a case where a secondary collision of the driver with the steering member occurs after an initial collision of a vehicle including the steering column device. In order to reduce the impact on the driver from the secondary collision, the steering column device includes a shock absorbing mechanism.

However, the steering column device including both the lock mechanism and the shock absorbing mechanism separate from the lock mechanism is large in overall size, and the attachment position and attachment attitude of such a steering column device are significantly limited.

The disclosure provides a steering column device whose lock mechanism protrudes less in a radial direction.

The disclosure also provides a steering column device reduced in size by using common components in a part of a lock mechanism and a part of a shock absorbing mechanism.

A steering column device according to a first aspect of the disclosure includes: an inner tube having a tubular shape and configured to hold a column shaft connected to a steering member such that the column shaft is rotatable; a housing configured to hold the inner tube such that the inner tube is movable in an axial direction of the inner tube; and a lock mechanism configured to restrict movement of the inner tube with respect to the housing at a plurality of positions. The lock mechanism includes a first engagement member, a second engagement member, a first urging member, a second urging member, a cam member, and an operation member. The first engagement member is fixedly provided on an outer peripheral surface of the inner tube and has a plurality of first teeth arranged in the axial direction of the inner tube. The second engagement member is fixed with respect to the housing in the axial direction. The second engagement member is configured to be brought into contact with and separated from the first engagement member in a radial direction of the inner tube, and has second teeth that mesh with the first teeth. The first urging member is configured to urge the second engagement member outward from the inner tube in the radial direction. The second urging member is disposed in one line with the second engagement member and the first urging member and is configured to urge the second engagement member in a direction opposite to a direction of an urging force of the first urging member. The cam member is configured to rotate about a rotation axis extending in a direction in which the first urging member and the second urging member are arranged and such that the second urging member serving as a follower is moved in the direction in which the first urging member and the second urging member are arranged to change a magnitude relationship between the urging force of the first urging member and an urging force of the second urging member. The operation lever is configured to operate the cam member.

According to the above aspect of the disclosure, the second engagement member functioning as a lock member is moved linearly in the radial direction of the inner tube. Therefore, the thickness of the lock mechanism in the radial direction of the inner tube can be reduced, and protrusion of the lock mechanism can be reduced.

A steering column device according to a second aspect of the disclosure includes an inner tube, a housing, and a lock mechanism. The inner tube has a tubular shape and is configured to hold a column shaft connected to a steering member such that the column shaft is rotatable. The housing is configured to hold the inner tube such that the inner tube is movable in an axial direction of the inner tube. The lock mechanism is configured to restrict movement of the inner tube with respect to the housing at a plurality of positions. The lock mechanism includes a first engagement member, a second engagement member, a first urging member, a pressing mechanism, and a maintaining mechanism. The first engagement member is fixedly provided on an outer peripheral surface of the inner tube and has a plurality of first teeth arranged in the axial direction of the inner tube. The second engagement member is fixed with respect to the housing in the axial direction via a shock absorbing member. The second engagement member is configured to be brought into contact with and separated from the first engagement member, and has second teeth that mesh with the first teeth. The first urging member is configured to urge the second engagement member outward from the inner tube. The pressing mechanism is configured to press the second engagement member toward the first engagement member against an urging force of the first urging member so as to cause the first teeth and the second teeth to mesh with each other. The maintaining member is configured to maintain the second engagement member at a position where the first teeth and the second teeth mesh with each other when a secondary collision occurs and the second engagement member moves, while deforming the shock absorbing member, to a position where the second engagement member is not pressed by the pressing mechanism.

According to the above aspect of the disclosure, the steering column device can be reduced in size and can be attached to a vehicle with improved flexibility.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
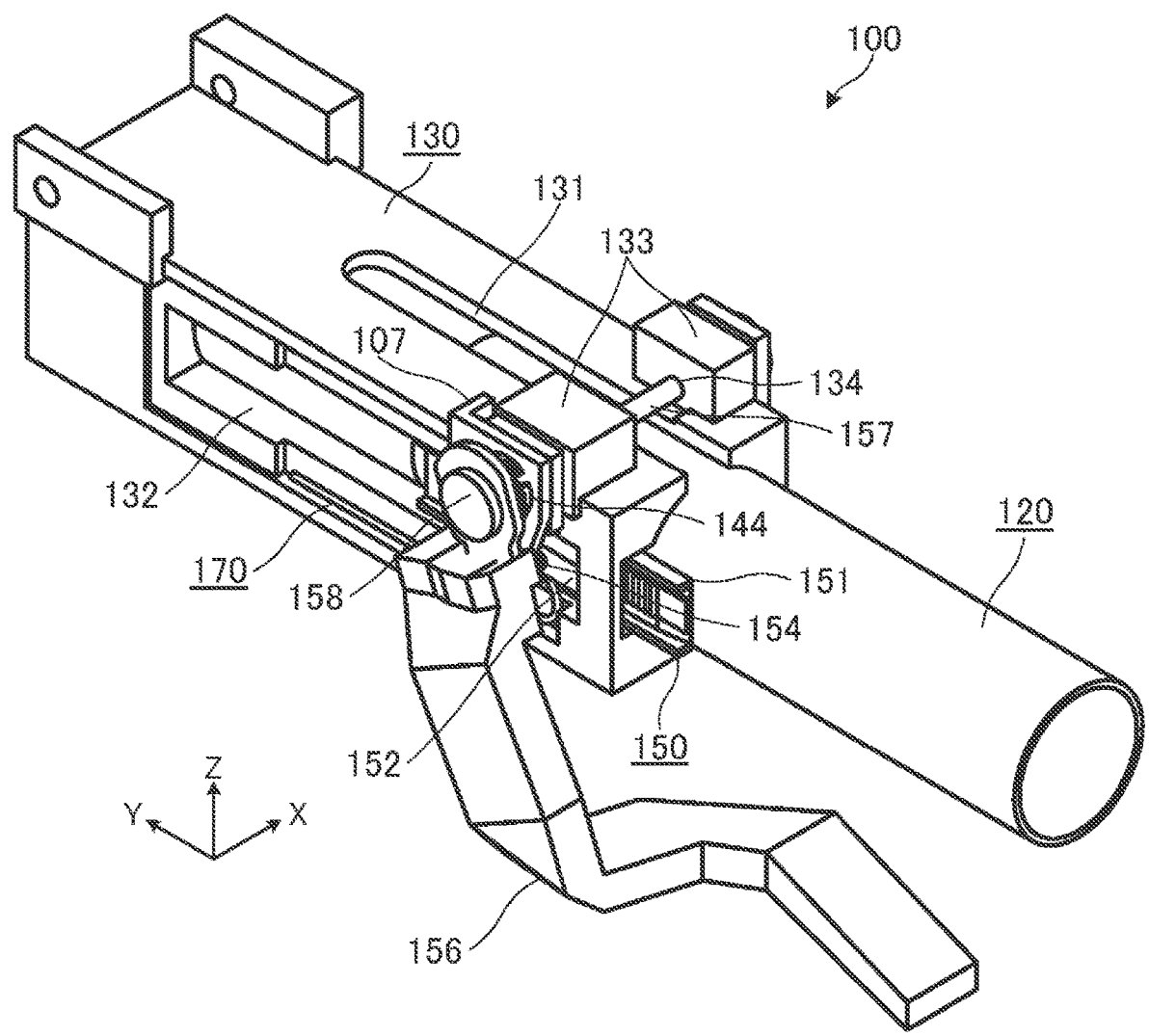
FIG. 1 is a perspective view showing the configuration of a steering column device according to a first embodiment.

Embodiments of a steering column device according to the disclosure will be described with reference to the accompanying drawings. Each of the embodiments described below illustrates a comprehensive or specific example. The numerical values, shapes, materials, constituent elements, positions and connections of the constituent elements, steps, order of steps, etc. described in the following embodiments are merely examples and are not intended to limit the disclosure.

The drawings are schematic views with components being emphasized, omitted, or adjusted in proportion as appropriate in order to illustrate the disclosure, and the shapes, positional relationships, and proportions in the drawings may be different from the actual shapes, positional relationships, and proportions.

Figure 7:
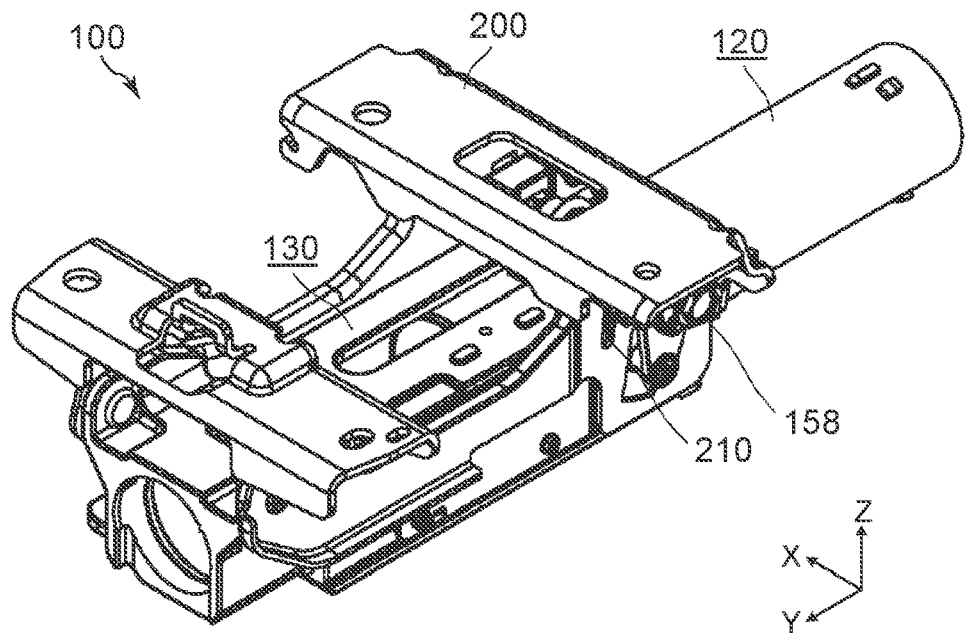
FIG. 7 is a perspective view of the steering column device with an attachment member attached thereto according to the first embodiment.

FIG. 1 is a perspective view showing the configuration of a steering column device according to a first embodiment of the disclosure. A steering column device 100 is a device that is able to hold, via a column shaft (not shown), a steering member (not shown) such that the steering member is rotatable, and to change the position of the steering member. The steering member is operated by an operator, and an example of the steering member is a steering wheel. The steering column device 100 includes an inner tube 120, a housing 130, an attachment member 200 (see FIG. 7), and a lock mechanism 150. In the first embodiment, the steering column device 100 further includes a shock absorbing member 170. Although the steering column device 100 may include the column shaft, a shaft member such as an intermediate shaft coupled to the column shaft, and a steering operation mechanism such as a rack and pinion mechanism, illustration and description of these components are omitted.

During normal use with no collision occurring, the steering column device 100 can change the position of the steering member according to the driver's physique (i.e., the driver's body size), etc. by rotating an operation lever 156 (will be described later) to the unlock side and sliding the inner tube 120 in the axial direction (Y-axis direction in the figure) with respect to the housing 130. The steering column device 100 can also fix the position of the inner tube 120 by the lock mechanism 150 by rotating the operation lever 156 to the lock side.

In the first embodiment, the steering column device 100 can also reduce the diameter of the housing 130 and tighten the inner tube 120 by rotating the operation lever 156 to the lock side. The steering column device 100 is attached in a suspended state to a vehicle body by, e.g., the attachment member 200 shown in FIG. 7, and the tilt of the housing 130 with respect to the vehicle body can be changed. The steering column device 100 further includes a mechanism capable of fixing the tilt of the housing 130 and releasing the housing 130 by the operation lever 156.

The column shaft held by the inner tube 120 is a member having a distal end (distal end on the negative side of the Y axis in the figure) to which the steering member that is steered by the operator is attached. The column shaft is inserted through and rotatably held in the housing 130 via the inner tube 120 and transmits the steering angle of the steering member to the steering operation mechanism such as the rack and pinion mechanism. In the first embodiment, the column shaft is held by the inner tube 120 via a bearing (not shown), is fixed with respect to the inner tube 120 in the axial direction, and is rotatable with respect to the inner tube 120 in the circumferential direction. The column shaft includes a spline fitting structure etc. The column shaft is configured to expand and contract and keep transmitting the steering angle when the inner tube 120 advances from and retracts into the housing 130.

The inner tube 120 is a member called a column jacket, an upper tube, etc. that holds the column shaft such that the column shaft is rotatable. The inner tube 120 is held by the housing 130 attached to the vehicle body. The inner tube 120 thus positions the steering member at a predetermined position via the column shaft such that the steering member is rotatable. Although the shape of the inner tube 120 is not particularly limited, the inner tube 120 in the first embodiment has a cylindrical (tubular) shape and is inserted in and held by the housing 130 having through-holes in the axial direction (Y-axis direction in the figure). The inner tube 120 holds the column shaft therein via at least one bearing, and moves with the column shaft in the axial direction (Y-axis direction in the figure) with respect to the housing 130.

The housing 130 is a member having a tubular portion. The tubular portion holds the inner tube 120 such that the inner tube 120 can move in the axial direction (Y-axis direction in the figure) with respect to the vehicle body. The housing 130 has a first slit 131 and clamped portions 133. The first slit 131 extends in the axial direction from one end face at the steering member-side of the housing 130 (i.e., one end face of the housing 130, the one end face being located on the side of the steering member) and extends through a wall of the housing 130 in the radial direction (Z-axis direction in the figure). The clamped portions 133 protrude in the radial direction from both sides of the first slit 131 in the circumferential direction. The first slit 131 is open at its one end at the steering member-side and is closed at the other end at the opposite side.

Each of the clamped portions 133 has a through-hole 134 extending perpendicularly to the axial direction of the inner tube 120 and the direction in which the first slit 131 extends through the wall of the housing 130 (Z-axis direction in the figure). The through-holes 134 are located outside the inner tube 120. A shaft 157, which serves as a rotation axis of the operation lever 156 that will be described later, is passed through the through-holes 134. The two clamped portions 133 respectively engage with both ends of the shaft 157 in the axial direction of the shaft 157. One of the clamped portions 133 engages with the end of the shaft 157 via a constricting and releasing mechanism 144. The constricting and releasing mechanism 144 has a cam that changes the distance between the clamped portions 133 in the axial direction of the shaft 157 in accordance with rotation of the operation lever 156. With this structure, the distance between the two clamped portions 133 facing each other can be reduced by rotation of the operation lever 156. By reducing the distance between the clamped portions 133, the housing 130 is reduced in diameter, and the inner tube 120 inserted in the housing 130 is tightened by the housing 130 around the inner tube 120 and is fixedly held by the housing 130.

The housing 130 also has a second slit 132. The second slit 132 allows a first engagement member 151 (will be described later), which is a part of the lock mechanism 150, to move with the inner tube 120 in the axial direction and also enables the lock mechanism 150 to be operated from the outside. In the first embodiment, the second slit 132 extends through the wall of the housing 130 in the radial direction of the inner tube 120 (X-axis direction in the figure). The direction in which the second slit 132 extends through the wall of the housing 130 crosses (in the first embodiment, is perpendicular to) the direction in which the first slit 131 extends through the wall of the housing 130. The second slit 132 are closed at its both ends in the axial direction.

The operation lever 156 is a member that is operated outside the inner tube 120 by the driver, etc. to switch the lock mechanism 150 between lock and unlock states. The lock mechanism 150 will be described in detail later. In the first embodiment, in addition to switching the lock mechanism 150 between the lock and unlock states, the operation lever 156 can position the inner tube 120 by pressing the two clamped portions 133 of the housing 130 toward each other and can also release the inner tube 120. The operation lever 156 includes the shaft 157 passed through the through-holes 134 on both sides of the first slit 131 of the housing 130, and rotates about the shaft 157. A flange portion 158 is provided on one end of the shaft 157, and a thrust bearing and a nut (not shown) are provided on the other end of the shaft 157.

The constricting and releasing mechanism 144 is provided between one of the clamped portions 133 and the flange portion 158. The constricting and releasing mechanism 144 includes two parts that rotate relative to each other. One of the two parts rotates with the operation lever 156 and the other part is movable along the shaft 157. Rotational movement of the constricting and releasing mechanism 144 about the axis is restricted by a through-hole 210 of the attachment member 200. By rotating the operation lever 156 about the shaft 157 as described above, the lock mechanism 150 can be switched to the lock state, and the distance between the clamped portions 133 can also be reduced to fix the inner tube 120 with respect to the housing 130.

Figure 2:
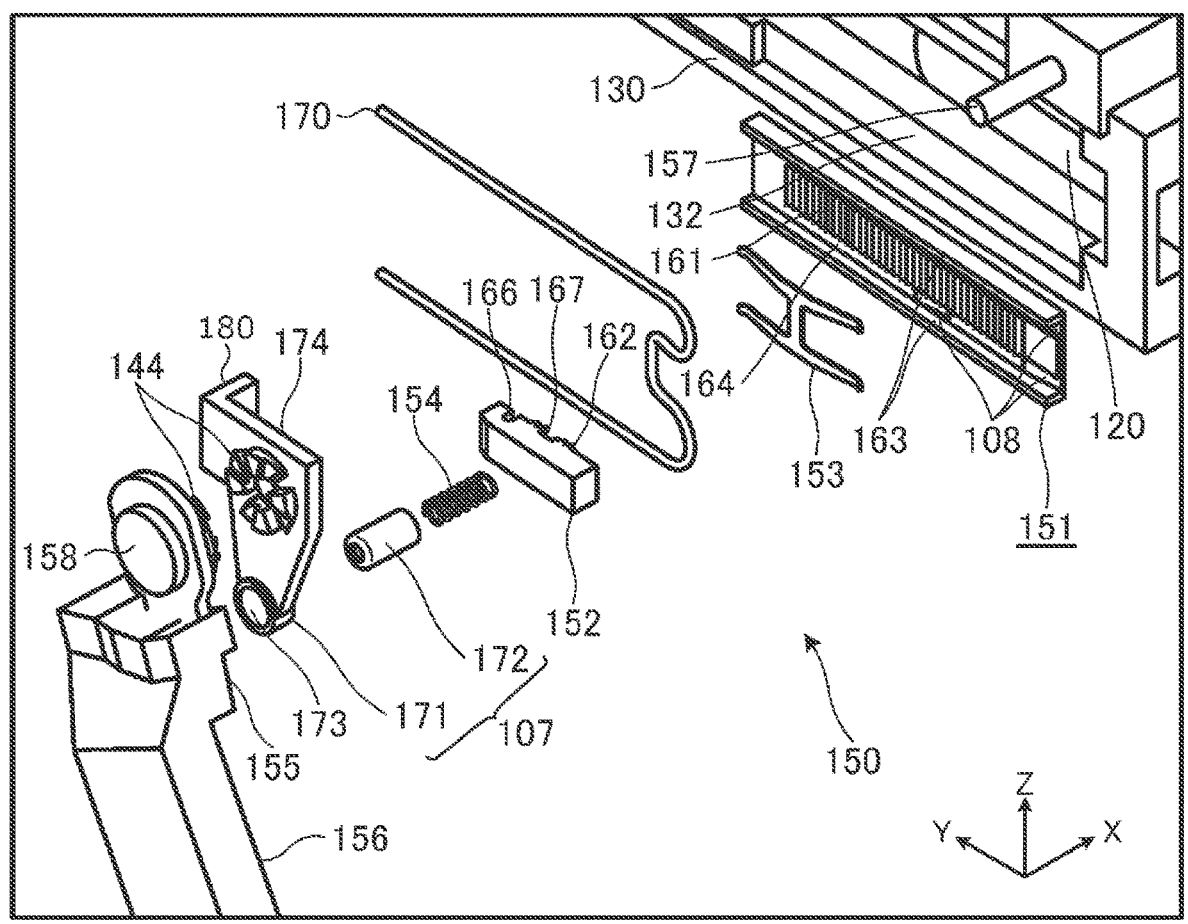
FIG. 2 is an exploded perspective view of a lock mechanism according to the first embodiment.
Figure 3:
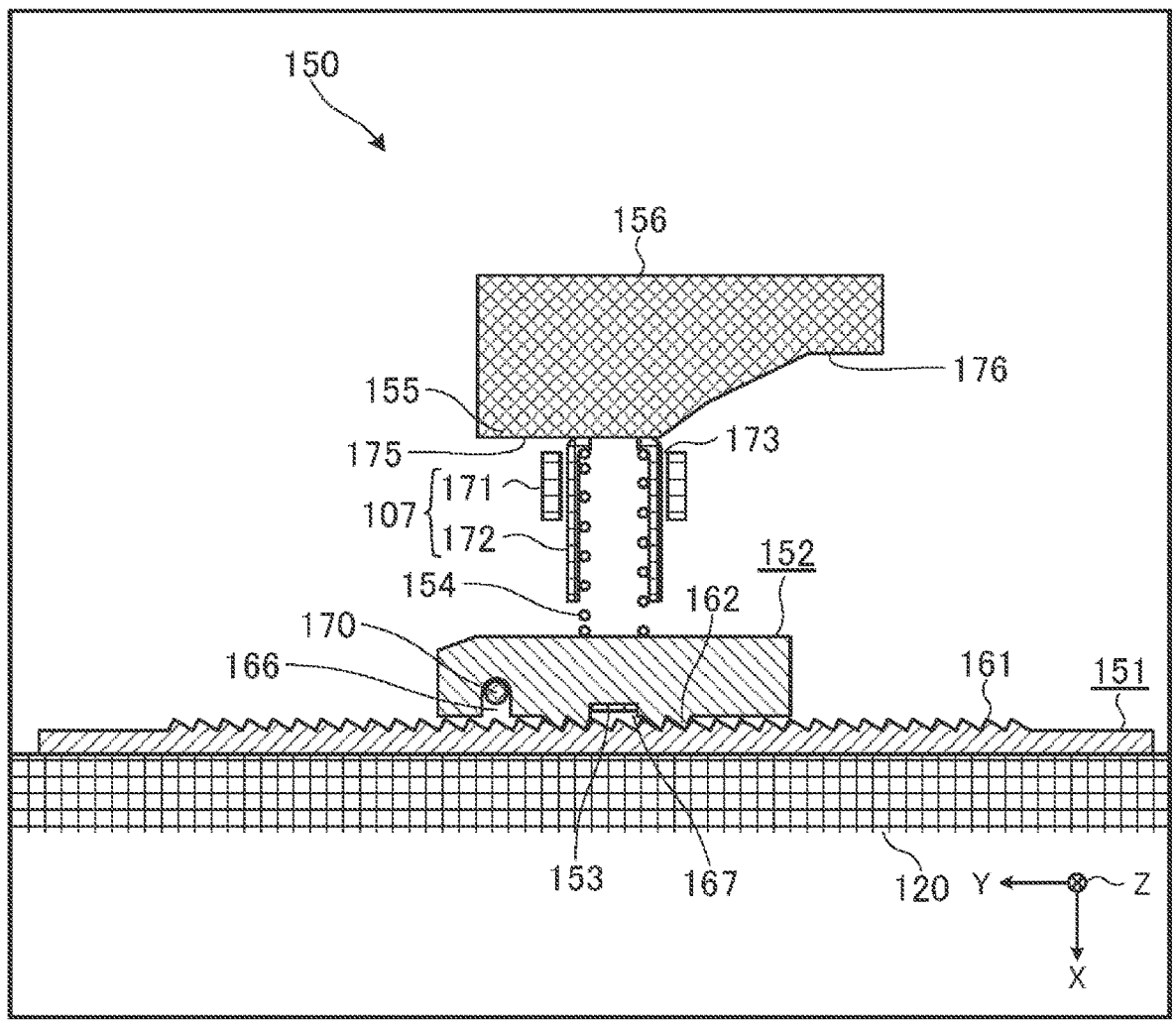
FIG. 3 is a sectional view of the lock mechanism in a lock state according to the first embodiment.

FIG. 2 is an exploded perspective view of the lock mechanism 150. FIG. 3 is a sectional view of the lock mechanism 150. The lock mechanism 150 is a linear motion mechanism capable of restricting movement of the inner tube 120 with respect to the housing 130 at a plurality of positions. The lock mechanism 150 includes the first engagement member 151, a second engagement member 152, a first urging member 153, a second urging member 154, a cam member 155, and the operation lever 156.

The first engagement member 151 is a member fixedly provided on the outer peripheral surface of the inner tube 120 and having a plurality of first teeth 161 arranged in the axial direction of the inner tube 120.

In the first embodiment, the first engagement member 151 is a strip-shaped (band-shaped) sheet metal member and has the first teeth 161 formed in its one surface so as to be arranged in the axial direction of the inner tube 120. The shape of the first teeth 161 is not particularly limited as long as the first teeth 161 engage with second teeth 162 that will be described later. For example, the first teeth 161 may be grooves, recesses, etc. formed at predetermined intervals. In the first embodiment, the first teeth 161 are ridges having a serrated shape in section and extending in a direction (width direction of the first engagement member 151) perpendicular to the direction in which the first teeth 161 are arranged (Y-axis direction in the figure).

In the first embodiment, the first engagement member 151 has walls 163 that respectively extend along its both edges in the width direction of the first engagement member 151 (Z-axis direction in the figure). The walls 163 stand in a direction outward from the inner tube 120. The first engagement member 151 has strip-shaped slide portions 164 each of which is located between a corresponding one of the walls 163 and a corresponding one of ends of the first teeth 161 in the width direction of the first engagement member 151. The slide portions 164 extend in the axial direction. The first urging member 153 contacts the slide portions 164, and the slide portions 164 slide on the first urging member 153 when the inner tube 120 moves in the axial direction.

The second engagement member 152 is a member that is fixed with respect to the housing 130 in the axial direction of the inner tube 120 during normal use before a secondary collision occurs. The second engagement member 152 is brought into contact with and is separated from the first engagement member 151 in the radial direction of the inner tube 120 (X-axis direction in the figure), and has second teeth 162 that mesh with the first teeth 161. In the first embodiment, the second engagement member 152 is fixed to the housing 130 via the shock absorbing member 170, and is movable with respect to the shock absorbing member 170 in the radial direction of the inner tube 120. Specifically, the second engagement member 152 has an engagement groove 166 in its surface facing the first engagement member 151. The engagement groove 166 is recessed in a direction away from the first engagement member 151 and extends in the width direction of the first engagement member 151. The shock absorbing member 170 fixed to the housing 130 is fitted in the engagement groove 166, and thus, movement of the second engagement member 152 in the axial direction of the inner tube 120 is fixedly restricted, and movement of the second engagement member 152 in the radial direction of the inner tube 120 is allowed.

The shape of the second teeth 162 is not particularly limited as long as the second teeth 162 engage with the first teeth 161. In the first embodiment, the second teeth 162 are ridges having a serrated shape in section corresponding to the sectional shape of the first teeth 161 and extending in the width direction of the first engagement member 151.

The second engagement member 152 has a holding groove 167 in its surface facing the first engagement member 151. The holding groove 167 is formed in an intermediate portion of the second engagement member 152 in the axial direction. The holding groove 167 is recessed in a direction away from the first engagement member 151 and extends in the width direction of the first engagement member 151. The holding groove 167 is a portion that holds the first urging member 153. In the first embodiment, a pair of the second teeth 162 is located on each side of the holding groove 167.

Figure 4:
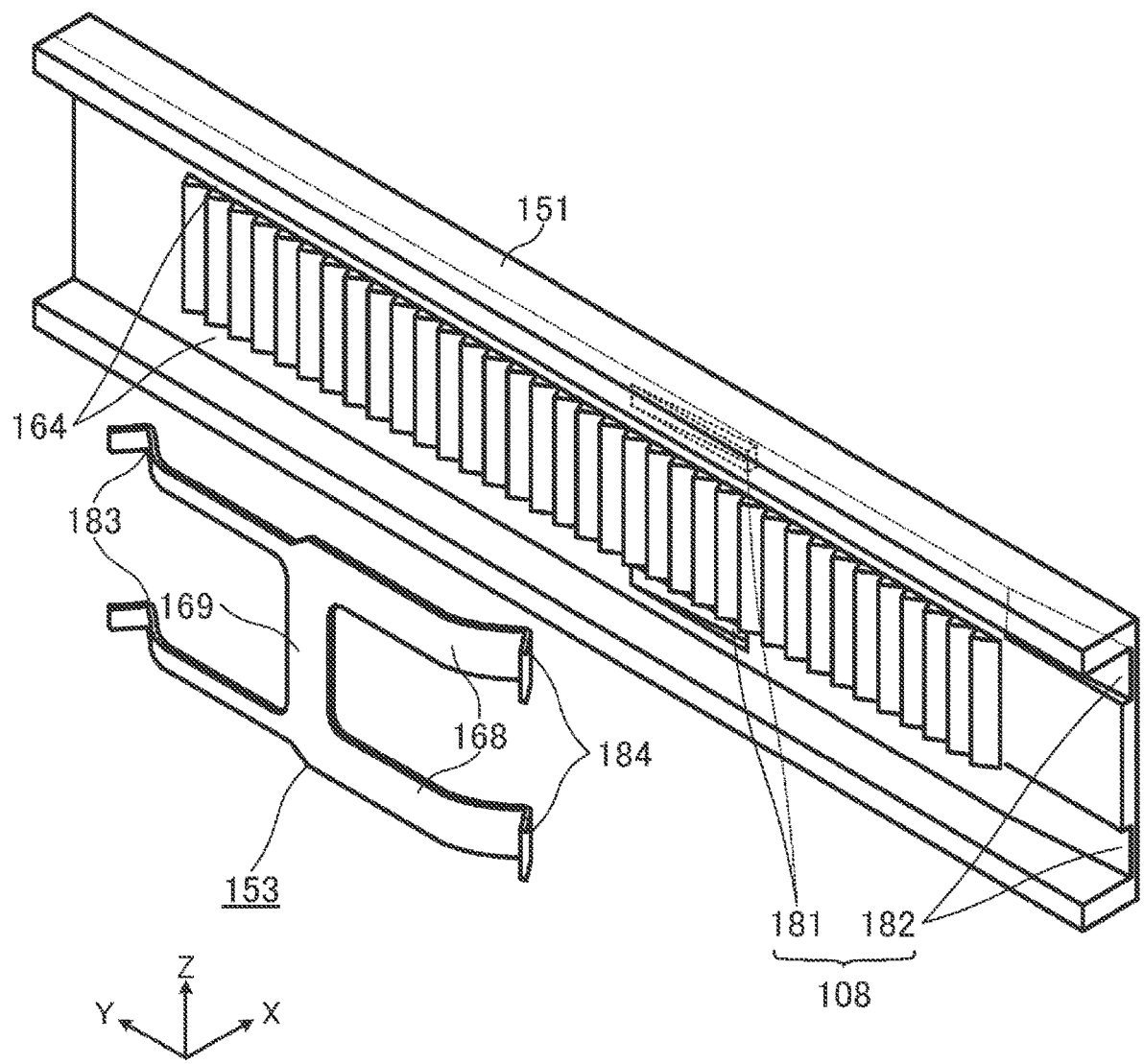
FIG. 4 is a perspective view of a first engagement member and a first urging member according to the first embodiment.

FIG. 4 is a perspective view of the first urging member 153. The first urging member 153 is a member that urges the second engagement member 152 outward from the inner tube 120 in the radial direction of the inner tube 120. Although the shape of the first urging member 153 is not particularly limited, the first urging member 153 in the first embodiment has an H-shape as viewed in plan. Specifically, the first urging member 153 has a pair of elastic portions 168 extending in the axial direction of the inner tube 120 and a holding portion 169 connecting the middle parts of the elastic portions 168 like a bridge. The elastic portions 168 are bent so as to protrude outward in the radial direction of the inner tube 120 (i.e., protrude in the negative X-axis direction in the figure). The elastic portions 168 have a function of a leaf spring that applies an urging force using the elasticity of the material of the first urging member 153 and the bending of the elastic portions 168. The elastic portions 168 are respectively disposed on both sides of the first teeth 161 and contact the slide portions 164 of the first engagement member 151. The holding portion 169 is fitted in the holding groove 167 of the second engagement member 152. The first urging member 153 urges the second engagement member 152 outward in the radial direction of the inner tube 120 using the balance between the urging forces of the elastic portions 168.

The second urging member 154 urges the second engagement member 152 in a direction opposite to a direction of the urging force of the first urging member 153. The second urging member 154 is disposed in one line with the second engagement member 152 and the first urging member 153. In the first embodiment, the urging axis of the first urging member 153, which indicates the urging direction of the first urging member 153, is in line with the urging axis of the second urging member 154. Accordingly, the second engagement member 152 sandwiched between the first urging member 153 and the second urging member 154 can move in the direction in which the first urging member 153 and the second urging member 154 are arranged, based on the relationship between the urging force of the first urging member 153 and the urging force of the second urging member 154.

Although the shape of the second urging member 154 is not particularly limited, the second urging member 154 in the first embodiment is a spring that expands and contracts in the direction in which the first urging member 153, the second engagement member 152, and the second urging member 154 are arranged. Specifically, the second urging member 154 is a coil spring.

In the first embodiment, the second urging member 154 is guided by a guide mechanism 107. The guide mechanism 107 is fixed with respect to the housing 130, and guides the expansion and contraction of the second urging member 154 and movement of the second urging member 154 in the direction in which the first urging member 153 and the second urging member 154 are arranged. Although the structure of the guide mechanism 107 is not particularly limited, the guide mechanism 107 in the first embodiment includes a holding element 172 and a guide member 171. The guide member 171 guides the holding element 172 in the direction in which the first urging member 153 and the second urging member 154 are arranged.

Although the shape of the holding element 172 is not particularly limited, the holding element 172 in the first embodiment has a cylindrical shape that accommodates and holds therein the second urging member 154 that is a coil spring. The holding element 172 has a flange at its one end and is open at the other end. The flange protrudes inward and engages with the second urging member 154. The second urging member 154 in an uncompressed state protrudes from the opening at the other end of the holding element 172. The length of the holding element 172 is smaller than the length of the second urging member 154 in the uncompressed state.

Although the shape of the guide member 171 is not particularly limited, the guide member 171 in the first embodiment includes a guide hole 173, a base 174, and a guide portion 180. The guide hole 173 guides the holding element 172 accommodating the second urging member 154 in the direction in which the first urging member 153 and the second urging member 154 are arranged. The base 174 holds the guide hole 173 at a predetermined position. The guide portion 180 extends in the axial direction of the shaft 157 from the base 174. Since the shaft 157 that serves as the rotation axis of the operation lever 156 is passed through the base 174 and the guide portion 180 engages with the through-hole 210 formed in a pair of side walls of the attachment member 200, the base 174 is fixed to the vehicle body. The base 174 has an annular cam, which is one of the two parts of the constricting and releasing mechanism 144, around the shaft 157 passed through the base 174. That is, the base 174 is movable along the shaft 157 due to rotation of the operation lever 156.

The cam member 155 is a member disposed outside the inner tube 120 (in the first embodiment, outside the housing 130). The cam member 155 changes the distance from the second urging member 154 to the first engagement member 151 to change the magnitude relationship between the urging force of the first urging member 153 and the urging force of the second urging member 154. In the first embodiment, as shown in FIG. 3, the cam member 155 has a close surface 175 and a far surface 176 that face the first engagement member 151. The close surface 175 is located close to the first engagement member 151, and the far surface 176 is located farther from the first engagement member 151 than the close surface 175 is. The close surface 175 and the far surface 176 are connected by a smooth surface. The close surface 175 or the far surface 176 contacts the second urging member 154 via the holding element 172 of the guide mechanism 107, and the second urging member 154 functions as a follower.

In the first embodiment, the cam member 155 is integrally attached to the operation lever 156, and the cam member 155 operates with the operation lever 156 when the operation lever 156 is operated. Specifically, when the operation lever 156 is rotated, the cam member 155 rotates about the shaft 157 extending in the direction in which the first urging member 153 and the second urging member 154 are arranged, and moves the second urging member 154 in a direction (direction in which the first urging member 153 and the second urging member 154 are arranged) perpendicular to the rotational direction (torque direction) of the operation lever 156.

The shock absorbing member 170 is a member fixed to the housing 130. The shock absorbing member 170 fixes the second engagement member 152 with respect to the housing 130 in the axial direction of the inner tube 120 during normal use. In the event of a secondary collision, the second engagement member 152 moves with respect to the housing 130 when the inner tube 120 is pressed into the housing 130. As a result, the shock absorbing member 170 deforms and absorbs the shock of the secondary collision. In the first embodiment, the shock absorbing member 170 is a rod member bent in an M-shape. The shock absorbing member 170 has its both ends fixed to the housing 130 and its middle part fitted in the engagement groove 166 of the second engagement member 152.

Next, operation of the steering column device 100 will be described. FIG. 3 shows the lock mechanism 150 in the lock state in which movement of the inner tube 120 with respect to the housing 130 is not allowed. When the close surface 175 of the cam member 155, the second urging member 154, the second engagement member 152, and the first urging member 153 are in one line, the close surface 175 of the cam member 155 presses the second urging member 154 toward the first urging member 153. As a result, the urging force of the second urging member 154 becomes greater than the urging force of the first urging member 153, and the first teeth 161 of the first engagement member 151 and the second teeth 162 of the second engagement member 152 mesh with each other. The lock mechanism 150 is thus switched to the lock state. Movement of the second urging member 154 is guided by the guide mechanism 107 in the direction in which the first urging member 153 and the second urging member 154 are arranged. The urging axis of the second urging member 154 that is a coil spring is aligned with the direction in which the first urging member 153 and the second urging member 154 are arranged, by the tubular holding element 172. The holding element 172 is not in contact with the second engagement member 152.

Figure 5:
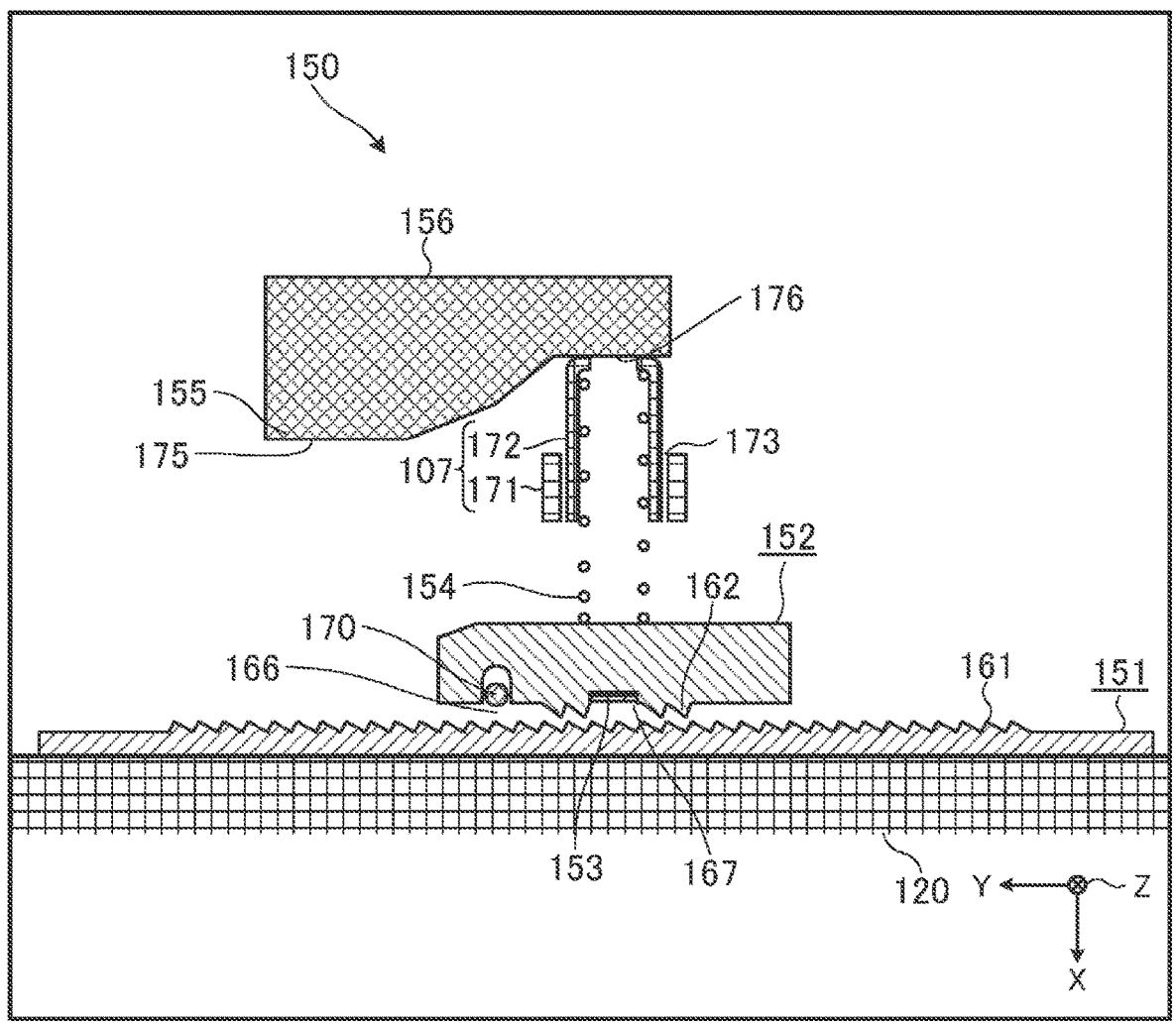
FIG. 5 is a sectional view of the lock mechanism in an unlock state according to the first embodiment.

Next, the driver, etc. rotates the operation lever 156 about the shaft 157 so that the far surface 176 of the cam member 155 that rotates with the operation lever 156 is located in one line with the second urging member 154, the second engagement member 152, and the first urging member 153 (see FIG. 5). In this state as well, the far surface 176 of the cam member 155 presses the second urging member 154 toward the first urging member 153. However, the second urging member 154 moves in a direction away from the first engagement member 151, and the second urging member 154 is therefore expanded to a relatively large extent. As a result, the urging force of the second urging member 154 becomes smaller than the urging force of the first urging member 153. The second engagement member 152 is therefore lifted by the urging force of the first urging member 153, and the first teeth 161 of the first engagement member 151 are disengaged from the second teeth 162 of the second engagement member 152.

By rotating the operation lever 156 about the shaft 157 to switch the positions of the close surface 175 and the far surface 176 of the cam member 155, the second engagement member 152 can be reciprocated via the second urging member 154 in a direction perpendicular to the rotating surface of the cam member 155. By this reciprocating movement of the second engagement member 152, the lock mechanism 150 can be switched as desired between the lock state in which the first teeth 161 and the second teeth 162 mesh with each other and the unlock state in which the first teeth 161 and the second teeth 162 are disengaged from each other.

Since the steering column device 100 includes the lock mechanism 150 having the above structure, it is possible to reduce the overall size of the steering column device 100 (i.e., the size of the steering column device 100 in the radial direction of the inner tube 120), and it is possible to improve flexibility in the attachment position at which the steering column device 100 is attached in the vehicle body, and flexibility in the attitude of the steering column device 100 in the vehicle body.

Figure 6:
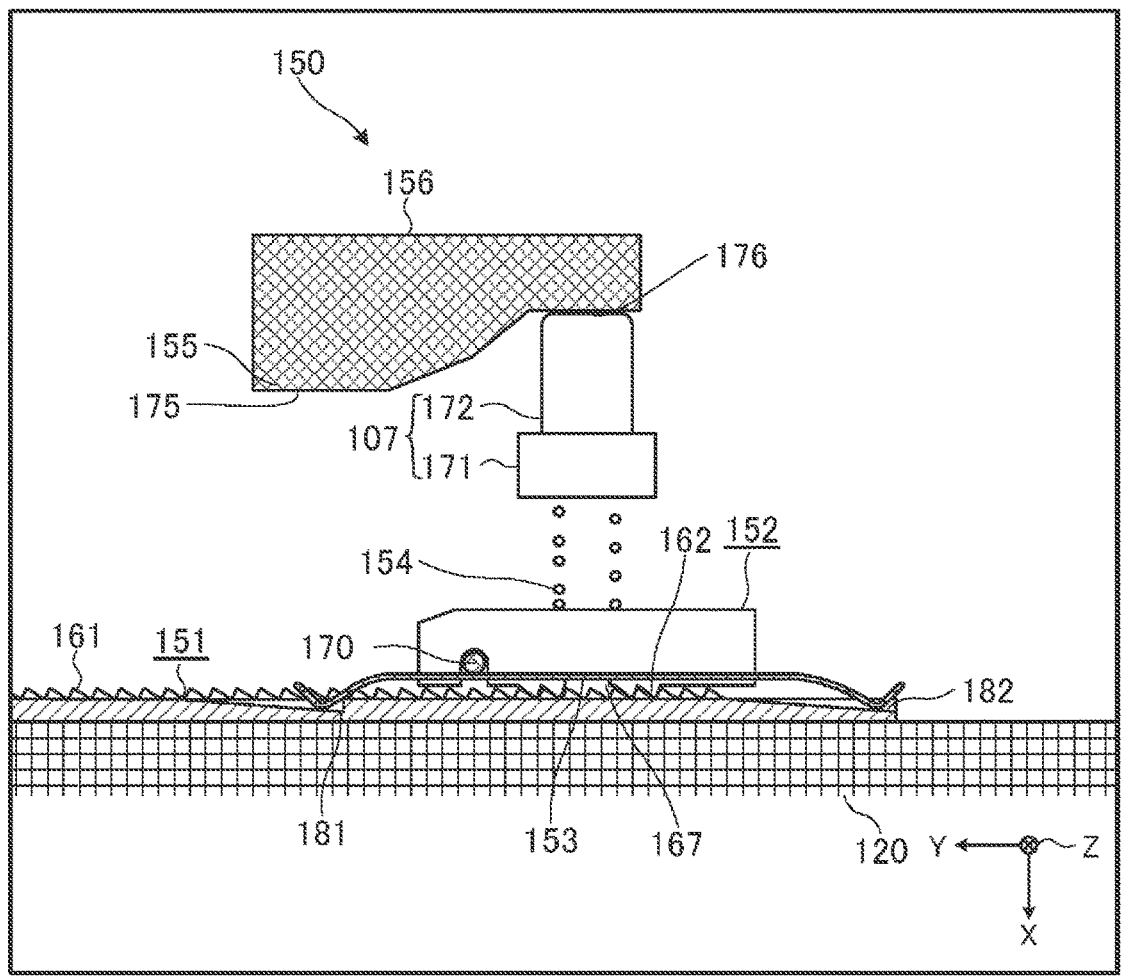
FIG. 6 is a sectional view of the lock mechanism in a short end restricted state according to the first embodiment.

The first engagement member 151 has recesses 108 in the ends at the steering member-side (negative side of the Y axis in the figure) of the slide portions 164 (i.e., the ends of the slide portions 164, the ends being located on the side of the steering member). The recesses 108 allow the first urging member 153 to move toward the inner tube 120 (toward the positive side of the X axis in the figure) when a part of the first urging member 153 enters the recesses 108. As shown in FIG. 6, when the first urging member 153 is located in the recesses 108 while the lock mechanism 150 is in the unlock state, the urging force of the second urging member 154 that urges the second engagement member 152 toward the first engagement member 151 becomes greater than the urging force of the first urging member 153, so that the first teeth 161 and the second teeth 162 mesh with each other. Movement of the inner tube 120 with respect to the housing 130 can thus be restricted.

The recesses 108 are formed in each of the two slide portions 164 so as to correspond to the shape of the first urging member 153. The recesses 108 include first recesses 181 and second recesses 182. The first recesses 181 and the second recesses 182 are arranged in the axial direction of the inner tube 120 (Y-axis direction in the figure). The second recesses 182 are formed at a position closer to the steering member than the first recesses 181 are. The width of each first recess 181 in a direction perpendicular to the axial direction of the inner tube 120, namely in the width direction of the first engagement member 151 is smaller than the width of each second recess 182 in the direction perpendicular to the axial direction of the inner tube 120. The first urging member 153 has an H-shape as viewed in plan and includes first contact portions 183 and second contact portions 184. The first contact portions 183 and the second contact portions 184 are arranged in the axial direction and contact the slide portions 164. The second contact portions 184 are located at a position closer to the steering member than the first contact portions 183 are. The width of each second contact portion 184 is larger than the width of each first recess 181 and smaller than the width of each second recess 182. The width of each first contact portion 183 is smaller than the width of each first recess 181. This configuration allows the second contact portions 184 to pass over the first recesses 181 without entering the first recesses 181. The first contact portions 183 and the second contact portions 184 can thus enter the first recesses 181 and the second recesses 182 at the same time, respectively. The first urging member 153 can therefore move in parallel with the first engagement member 151, and the second engagement member 152 can be moved toward the first engagement member 151 without being tilted.

In the steering column device 100 according to the first embodiment, since the first engagement member 151 has the recesses 108, the short end of the inner tube 120 is restricted by the components of the lock mechanism 150. The total number of components of the steering column device 100 can thus be reduced.

The disclosure is not limited to the first embodiment. For example, the disclosure may be carried out in other embodiments that are implemented by combining as desired the constituent elements described in the specification or excluding a part of the constituent elements. The above embodiment may be modified by those skilled in the art without departing from the scope of the disclosure, and such modifications are also included in the disclosure.

For example, the above embodiment illustrates the case where the first engagement member 151 is a member separate from the inner tube 120 and the inner tube 120 is fixedly attached to the first engagement member 151 by welding, etc. However, the first engagement member 151 may be integral with the inner tube 120.

Each of the first urging member 153, the second urging member 154, the first engagement member 151, the second engagement member 152, etc. may be made of a desired material such as metal.

The above embodiment illustrates the case where rotation of the operation lever 156 can switch the lock mechanism 150 between the lock and unlock states, and can also tighten the inner tube by reducing the distance between the clamped portions 133 of the housing 130 or release the inner tube 120. However, the disclosure is not limited to this.

The above embodiment illustrates the case where one of the two parts of the constricting and releasing mechanism 144 is integral with the guide member 171. However, the guide mechanism 107 and the constricting and releasing mechanism 144 may be separate mechanisms.

The above embodiment illustrates the case where the shock absorbing member 170 holds the second engagement member 152 in the axial direction of the inner tube 120. However, the lock mechanism 150 and a shock absorbing mechanism including the shock absorbing member 170 may be separate mechanisms.

The disclosure can be used in devices related to steering of a vehicle.

Figure 8:
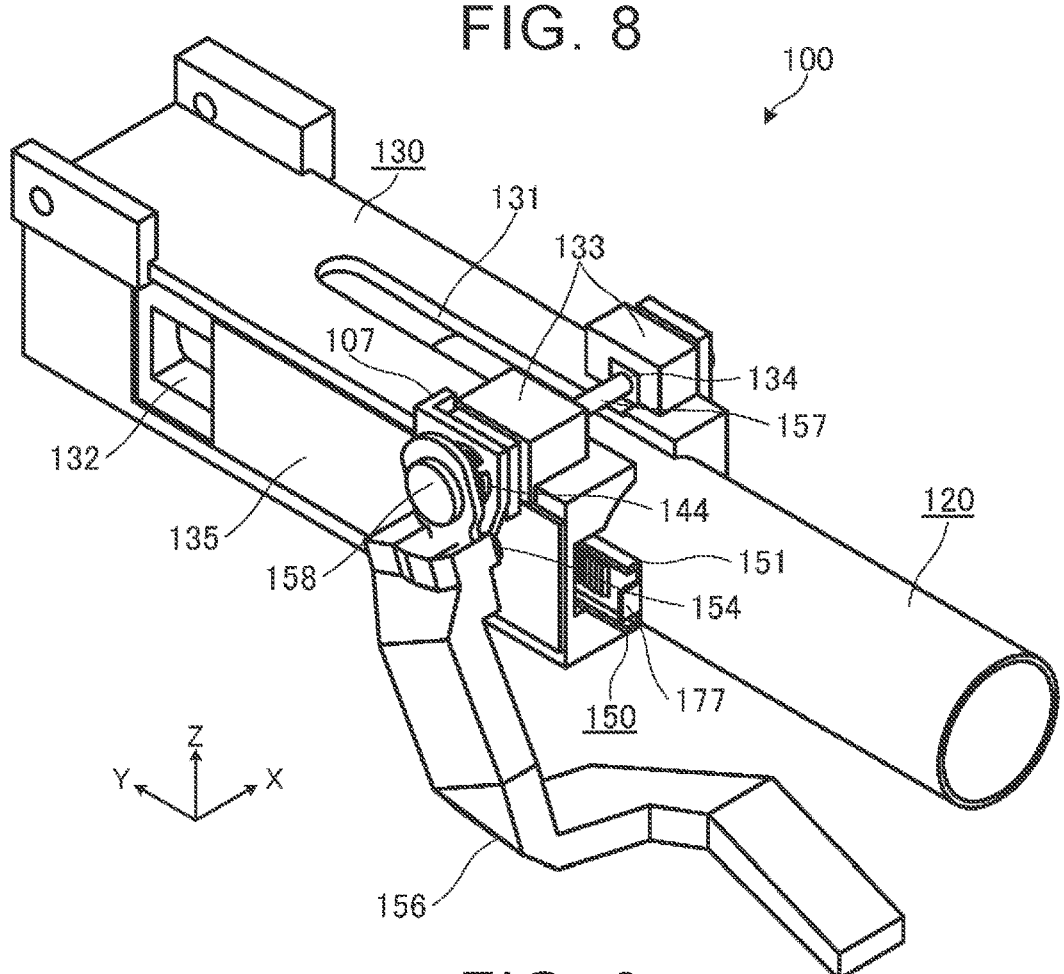
FIG. 8 is a perspective view showing the configuration of a steering column device according to a second embodiment.
Figure 16:
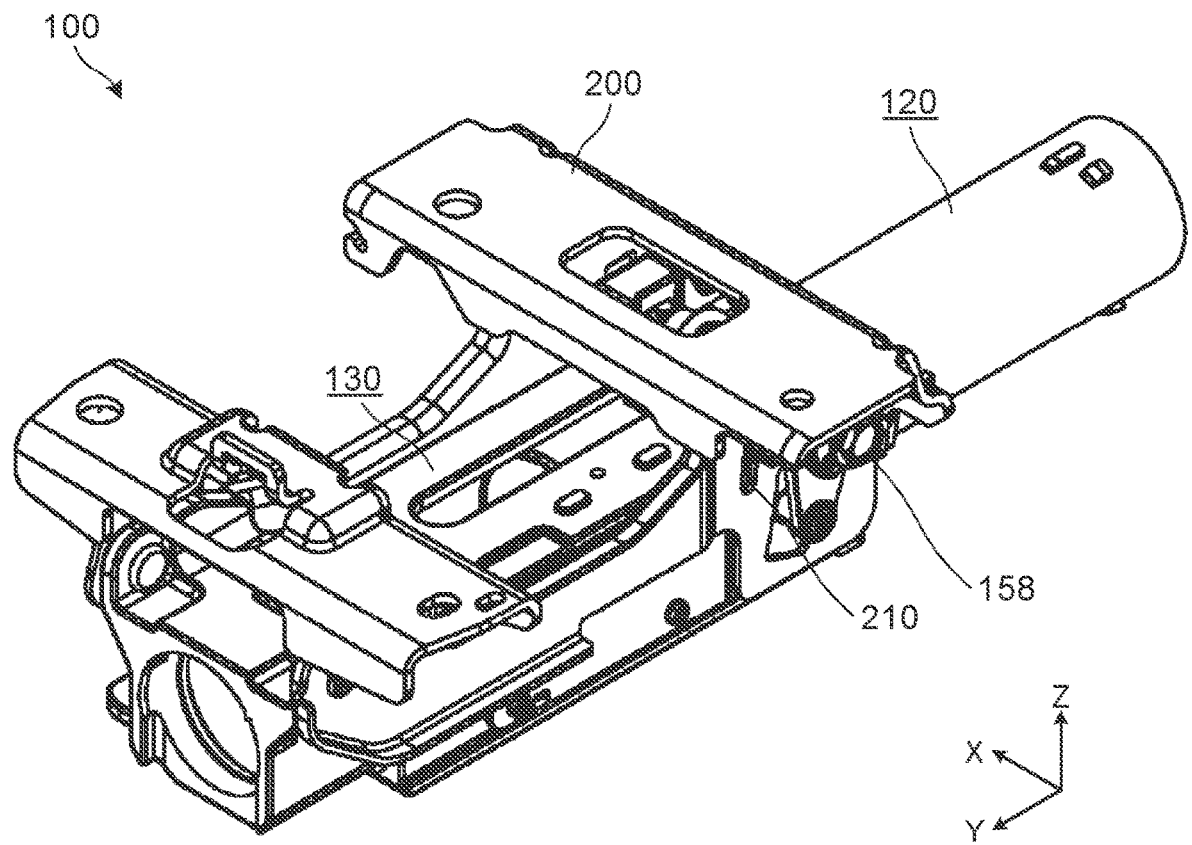
FIG. 16 is a perspective view of a steering column device with an attachment member attached thereto according to an embodiment.

FIG. 8 is a perspective view showing the configuration of a steering column device according to a second embodiment of the disclosure. A steering column device 100 is a device that is able to hold, via a column shaft (not shown), a steering member (not shown) such that the steering member is rotatable, and to change the position of the steering member. The steering member is operated by an operator, and an example of the steering member is a steering wheel. The steering column device 100 includes an inner tube 120, a housing 130, an attachment member 200 (see FIG. 16), a lock mechanism 150, and a shock absorbing member 170. Although the steering column device 100 may include the column shaft, a shaft member such as an intermediate shaft coupled to the column shaft, and a steering operation mechanism such as a rack and pinion mechanism, illustration and description of these components are omitted.

During normal use with no collision occurring, the steering column device 100 can change the position of the steering member according to the driver's physique (i.e., the driver's body size), etc. by rotating an operation lever 156 (will be described later) to the unlock side and sliding the inner tube 120 in the axial direction (Y-axis direction in the figure) with respect to the housing 130. The steering column device 100 can also fix the position of the inner tube 120 by the lock mechanism 150 by rotating the operation lever 156 to the lock side.

In the second embodiment, the steering column device 100 can also reduce the diameter of the housing 130 and tighten the inner tube 120 by rotating the operation lever 156 to the lock side. The steering column device 100 is attached in a suspended state to a vehicle body by, e.g., the attachment member 200 shown in FIG. 16, and the tilt of the housing 130 with respect to the vehicle body can be changed. The steering column device 100 further includes a mechanism capable of fixing the tilt of the housing 130 and releasing the housing 130 by the operation lever 156.

The column shaft held by the inner tube 120 is a member having a distal end (distal end on the negative side of the Y axis in the figure) to which the steering member that is steered by the operator is attached. The column shaft is inserted through and rotatably held in the housing 130 via the inner tube 120 and transmits the steering angle of the steering member to the steering operation mechanism such as the rack and pinion mechanism. In the second embodiment, the column shaft is held by the inner tube 120 via a bearing (not shown), is fixed with respect to the inner tube 120 in the axial direction, and is rotatable with respect to the inner tube 120 in the circumferential direction. The column shaft includes a spline fitting structure etc. The column shaft is configured to expand and contract and keep transmitting the steering angle when the inner tube 120 advances from and retracts into the housing 130.

The inner tube 120 is a member called a column jacket, an upper tube, etc. that holds the column shaft such that the column shaft is rotatable. The inner tube 120 is held by the housing 130 attached to the vehicle body. The inner tube 120 thus positions the steering member at a predetermined position via the column shaft such that the steering member is rotatable. Although the shape of the inner tube 120 is not particularly limited, the inner tube 120 in the second embodiment has a cylindrical (tubular) shape and is inserted in and held by the housing 130 having through-holes in the axial direction (Y-axis direction in the figure). The inner tube 120 holds the column shaft therein via at least one bearing, and moves with the column shaft in the axial direction (Y-axis direction in the figure) with respect to the housing 130.

The housing 130 is a member having a tubular portion. The tubular portion holds the inner tube 120 such that the inner tube 120 can move in the axial direction (Y-axis direction in the figure) with respect to the vehicle body. The housing 130 has a first slit 131 and clamped portions 133. The first slit 131 extends in the axial direction from one end face at the steering member-side of the housing 130 (i.e., one end face of the housing 130, the one end face being located on the side of the steering member) and extends through a wall of the housing 130 in the radial direction (Z-axis direction in the figure). The clamped portions 133 protrude in the radial direction from both sides of the first slit 131 in the circumferential direction. The first slit 131 is open at its one end at the steering member-side and is closed at the other end at the opposite side.

Each of the clamped portions 133 has a through-hole 134 extending perpendicularly to the axial direction of the inner tube 120 and the direction in which the first slit 131 extends through the wall of the housing 130 (Z-axis direction in the figure). The through-holes 134 are located outside the inner tube 120. A shaft 157, which serves as a rotation axis of the operation lever 156 that will be described later, is passed through the through-holes 134. The two clamped portions 133 respectively engage with both ends of the shaft 157 in the axial direction of the shaft 157. One of the clamped portions 133 engages with the end of the shaft 157 via a constricting and releasing mechanism 144. The constricting and releasing mechanism 144 has a cam that changes the distance between the clamped portions 133 in the axial direction of the shaft 157 in accordance with rotation of the operation lever 156. With this structure, the distance between the two clamped portions 133 facing each other can be reduced by rotation of the operation lever 156. By reducing the distance between the clamped portions 133, the housing 130 is reduced in diameter, and the inner tube 120 inserted in the housing 130 is tightened by the housing 130 around the inner tube 120 and is fixedly held by the housing 130.

The housing 130 also has a second slit 132. The second slit 132 allows a first engagement member 151 (will be described later), which is a part of the lock mechanism 150, to move with the inner tube 120 in the axial direction and also enables the lock mechanism 150 to be operated from the outside. In the second embodiment, the second slit 132 extends through the wall of the housing 130 in the radial direction of the inner tube 120 (X-axis direction in the figure). The direction in which the second slit 132 extends through the wall of the housing 130 crosses (in the second embodiment, is perpendicular to) the direction in which the first slit 131 extends through the wall of the housing 130. The second slit 132 are closed at its both ends in the axial direction.

The operation lever 156 is a member that is operated outside the inner tube 120 by the driver, etc. to switch the lock mechanism 150 between lock and unlock states. The lock mechanism 150 will be described in detail later. In the second embodiment, in addition to switching the lock mechanism 150 between the lock and unlock states, the operation lever 156 can position the inner tube 120 by pressing the two clamped portions 133 of the housing 130 toward each other and can also release the inner tube 120. The operation lever 156 includes the shaft 157 passed through the through-holes 134 on both sides of the first slit 131 of the housing 130, and rotates about the shaft 157. A flange portion 158 is provided on one end of the shaft 157, and a thrust bearing and a nut (not shown) are provided on the other end of the shaft 157.

The constricting and releasing mechanism 144 is provided between one of the clamped portions 133 and the flange portion 158. The constricting and releasing mechanism 144 includes two parts that rotate relative to each other. One of the two parts rotates with the operation lever 156 and the other part is movable along the shaft 157. Rotational movement of the constricting and releasing mechanism 144 about the axis is restricted by a through-hole 210 of the attachment member 200. By rotating the operation lever 156 about the shaft 157 as described above, the lock mechanism 150 can be switched to the lock state, and the distance between the clamped portions 133 can also be reduced to fix the inner tube 120 with respect to the housing 130.

Figure 9:
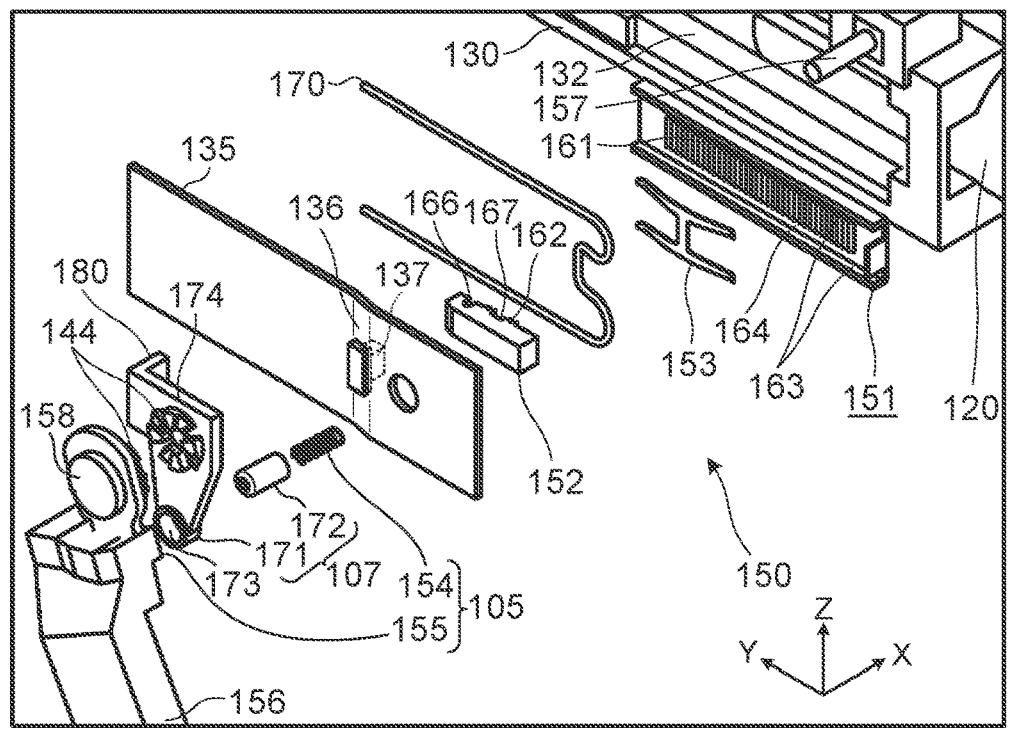
FIG. 9 is an exploded perspective view of a lock mechanism according to the second embodiment.
Figure 10:
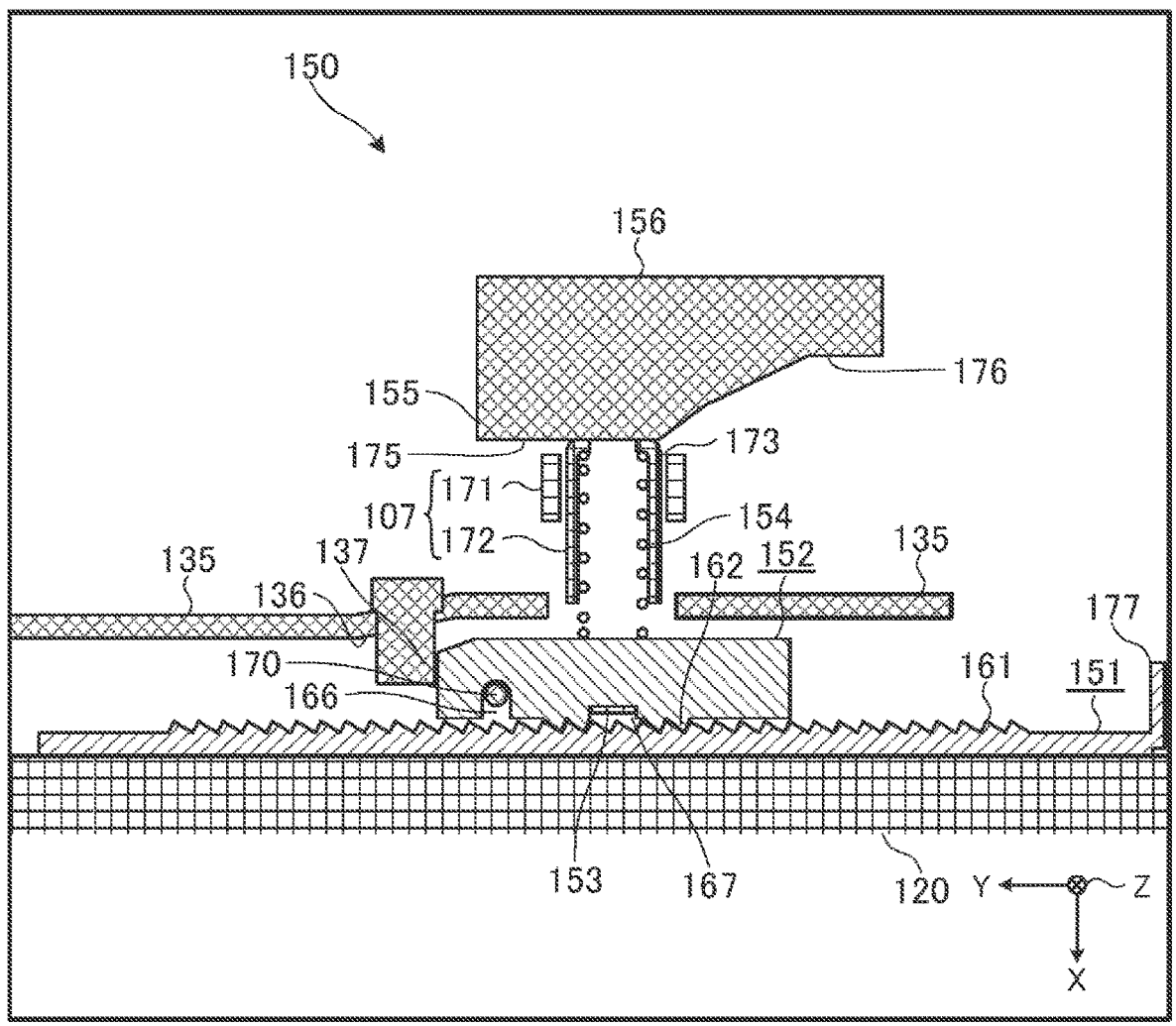
FIG. 10 is a sectional view of the lock mechanism in a lock state according to the second embodiment.

FIG. 9 is an exploded perspective view of the lock mechanism 150. FIG. 10 is a sectional view of the lock mechanism 150. The lock mechanism 150 is a mechanism capable of restricting movement of the inner tube 120 with respect to the housing 130 at a plurality of positions. The lock mechanism 150 includes the first engagement member 151, a second engagement member 152, a first urging member 153, a pressing mechanism 105, a maintaining member 135, and the operation lever 156.

The first engagement member 151 is a member fixedly provided on the outer peripheral surface of the inner tube 120 and having a plurality of first teeth 161 arranged in the axial direction of the inner tube 120. In the second embodiment, the first engagement member 151 is a strip-shaped (band-shaped) sheet metal member and has the first teeth 161 formed in its one surface so as to be arranged in the axial direction of the inner tube 120. The shape of the first teeth 161 is not particularly limited as long as the first teeth 161 engage with second teeth 162 that will be described later. For example, the first teeth 161 may be grooves, recesses, etc. formed at predetermined intervals. In the second embodiment, the first teeth 161 are ridges having a serrated shape in section and extending in a direction (width direction of the first engagement member 151) perpendicular to the direction in which the first teeth 161 are arranged (Y-axis direction in the figure).

Figure 11:
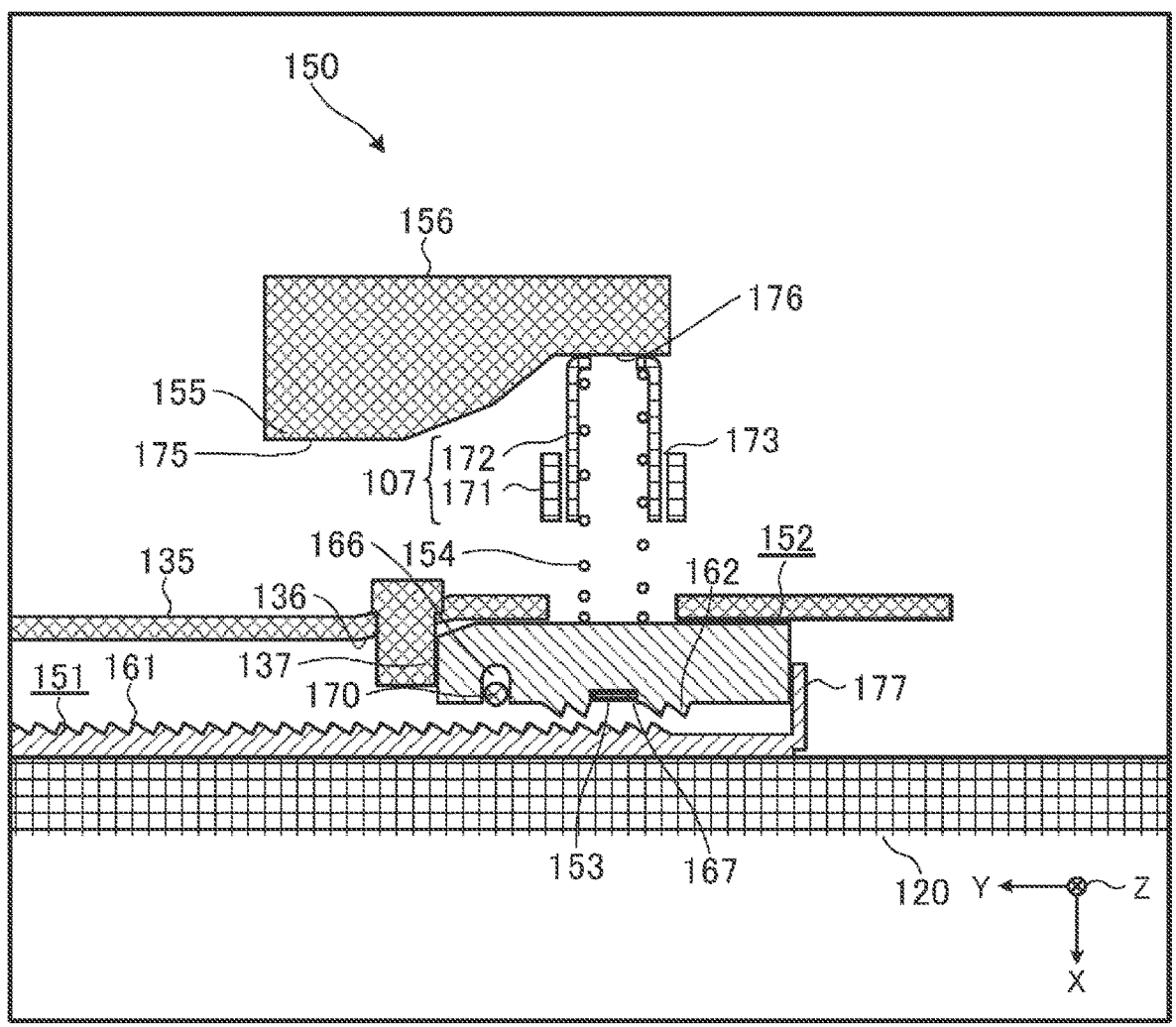
FIG. 11 is a sectional view of the lock mechanism in an unlock state and a short end restricted state according to the second embodiment.

As shown in FIG. 11, the first engagement member 151 has a contact portion 177. The contact portion 177 protrudes to such a position that the contact portion 177 contacts an end, in the axial direction (Y-axis direction in the figure), of the second engagement member 152 even when the second engagement member 152 is separated from the first engagement member 151. The contact portion 177 is integral with the end at the steering member-side (negative side of the Y axis in the figure) of the first engagement member 151 in the axial direction (i.e., the end of the first engagement member 151 in the axial direction, the end being located on the side of the steering member), and stands from this end of the first engagement member 151. In order to reduce the impact that is caused by contact between the contact portion 177 and the second engagement member 152, a cushioning member such as rubber may be attached to at least one of the contact portion 177 and the part of the second engagement member 152 that contacts the contact portion 177.

In the second embodiment, the first engagement member 151 has walls 163 that respectively extend along its both edges in the width direction of the first engagement member 151 (Z-axis direction in the figure). The walls 163 stand in a direction outward from the inner tube 120. The first engagement member 151 has strip-shaped slide portions 164 each of which is located between a corresponding one of the walls 163 and a corresponding one of ends of the first teeth 161 in the width direction of the first engagement member 151. The slide portions 164 extend in the axial direction. The first urging member 153 contacts the slide portions 164, and the slide portions 164 slide on the first urging member 153 when the inner tube 120 moves in the axial direction.

The second engagement member 152 is a member that is fixed with respect to the housing 130 in the axial direction of the inner tube 120 via the shock absorbing member 170 during normal use before a secondary collision occurs. The second engagement member 152 is brought into contact with and is separated from the first engagement member 151 in the radial direction of the inner tube 120 (X-axis direction in the figure), and has second teeth 162 that mesh with the first teeth 161. In the second embodiment, the second engagement member 152 is fixed with respect to the housing 130 via the shock absorbing member 170, and is movable with respect to the shock absorbing member 170 in the radial direction of the inner tube 120. Specifically, the second engagement member 152 has an engagement groove 166 in its surface facing the first engagement member 151. The engagement groove 166 is recessed in a direction away from the first engagement member 151 and extends in the width direction of the first engagement member 151. The shock absorbing member 170 fixed to the housing 130 is fitted in the engagement groove 166, and thus, movement of the second engagement member 152 in the axial direction of the inner tube 120 is fixedly restricted, and movement of the second engagement member 152 in the radial direction of the inner tube 120 is allowed.

The shape of the second teeth 162 is not particularly limited as long as the second teeth 162 engage with the first teeth 161. In the second embodiment, the second teeth 162 are ridges having a serrated shape in section corresponding to the sectional shape of the first teeth 161 and extending in the width direction of the first engagement member 151.

The second engagement member 152 has a holding groove 167 in its surface facing the first engagement member 151. The holding groove 167 is formed in an intermediate portion of the second engagement member 152 in the axial direction. The holding groove 167 is recessed in a direction away from the first engagement member 151 and extends in the width direction of the first engagement member 151. The holding groove 167 is a portion that holds the first urging member 153. In the second embodiment, a pair of the second teeth 162 is located on each side of the holding groove 167.

Figure 13:
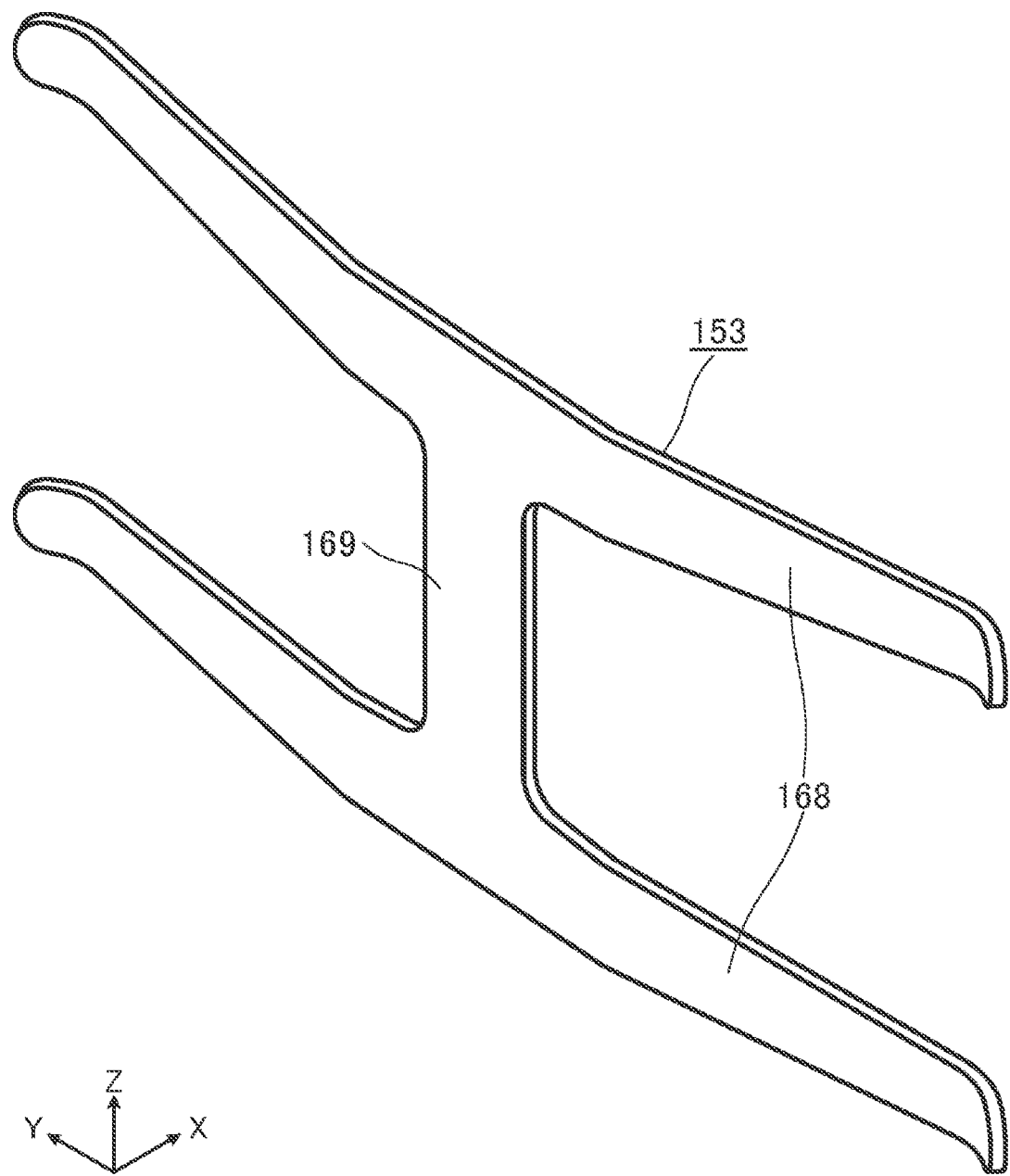
FIG. 13 is a perspective view of a first urging member according to the second embodiment.

FIG. 13 is a perspective view of the first urging member 153. The first urging member 153 is a member that urges the second engagement member 152 outward from the inner tube 120 in the radial direction of the inner tube 120. Although the shape of the first urging member 153 is not particularly limited, the first urging member 153 in the second embodiment has an H-shape as viewed in plan. Specifically, the first urging member 153 has a pair of elastic portions 168 extending in the axial direction of the inner tube 120 and a holding portion 169 connecting the middle parts of the elastic portions 168 like a bridge. The elastic portions 168 are bent so as to protrude outward in the radial direction of the inner tube 120 (i.e., protrude in the negative X-axis direction in the figure). The elastic portions 168 have a function of a leaf spring that applies an urging force using the elasticity of the material of the first urging member 153 and the bending of the elastic portions 168. The elastic portions 168 are respectively disposed on both sides of the first teeth 161 and contact the slide portions 164 of the first engagement member 151. The holding portion 169 is fitted in the holding groove 167 of the second engagement member 152. The first urging member 153 urges the second engagement member 152 outward in the radial direction of the inner tube 120 using the balance between the urging forces of the elastic portions 168.

The pressing mechanism 105 is a mechanism that presses the second engagement member 152 toward the first engagement member 151 against the urging force of the first urging member 153 so that the first teeth 161 and the second teeth 162 mesh with each other. In the second embodiment, the pressing mechanism 105 includes the second urging member 154 and a cam member 155.

The second urging member 154 urges the second engagement member 152 in a direction opposite to a direction of the urging force of the first urging member 153. In the second embodiment, the second urging member 154 is disposed in one line with the second engagement member 152 and the first urging member 153. The urging axis of the first urging member 153, which indicates the urging direction of the first urging member 153, is in line with the urging axis of the second urging member 154. Accordingly, the second engagement member 152 sandwiched between the first urging member 153 and the second urging member 154 can move in the direction in which the first urging member 153 and the second urging member 154 are arranged, based on the relationship between the urging force of the first urging member 153 and the urging force of the second urging member 154.

Although the shape of the second urging member 154 is not particularly limited, the second urging member 154 in the second embodiment is a spring that expands and contracts in the direction in which the first urging member 153, the second engagement member 152, and the second urging member 154 are arranged. Specifically, the second urging member 154 is a coil spring.

In the second embodiment, the second urging member 154 is guided by a guide mechanism 107. The guide mechanism 107 is fixed with respect to the housing 130, and guides the expansion and contraction of the second urging member 154 and movement of the second urging member 154 in the direction in which the first urging member 153 and the second urging member 154 are arranged. Although the structure of the guide mechanism 107 is not particularly limited, the guide mechanism 107 in the second embodiment includes a holding element 172 and a guide member 171. The guide member 171 guides the holding element 172 in the direction in which the first urging member 153 and the second urging member 154 are arranged.

Although the shape of the holding element 172 is not particularly limited, the holding element 172 in the second embodiment has a cylindrical shape that accommodates and holds therein the second urging member 154 that is a coil spring. The holding element 172 has a flange at its one end and is open at the other end. The flange protrudes inward and engages with the second urging member 154. The second urging member 154 in an uncompressed state protrudes from the opening at the other end of the holding element 172. The length of the holding element 172 is smaller than the length of the second urging member 154 in the uncompressed state.

Although the shape of the guide member 171 is not particularly limited, the guide member 171 in the second embodiment includes a guide hole 173, a base 174, and a guide portion 180. The guide hole 173 guides the holding element 172 accommodating the second urging member 154 in the direction in which the first urging member 153 and the second urging member 154 are arranged. The base 174 holds the guide hole 173 at a predetermined position. The guide portion 180 extends in the axial direction of the shaft 157 from the base 174. Since the shaft 157 that serves as the rotation axis of the operation lever 156 is passed through the base 174 and the guide portion 180 engages with the through-hole 210 formed in a pair of side walls of the attachment member 200, the base 174 is fixed to the vehicle body. The base 174 has an annular cam, which is one of the two parts of the constricting and releasing mechanism 144, around the shaft 157 passed through the base 174. That is, the base 174 is movable along the shaft 157 due to rotation of the operation lever 156.

The cam member 155 is a member disposed outside the inner tube 120 (in the second embodiment, outside the housing 130). The cam member 155 changes the distance from the second urging member 154 to the first engagement member 151 to change the magnitude relationship between the urging force of the first urging member 153 and the urging force of the second urging member 154. In the second embodiment, as shown in FIG. 10, the cam member 155 has a close surface 175 and a far surface 176 that face the first engagement member 151. The close surface 175 is located close to the first engagement member 151, and the far surface 176 is located farther from the first engagement member 151 than the close surface 175 is. The close surface 175 and the far surface 176 are connected by a smooth surface. The close surface 175 or the far surface 176 contacts the second urging member 154 via the holding element 172 of the guide mechanism 107, and the second urging member 154 functions as a follower.

In the second embodiment, the cam member 155 is integrally attached to the operation lever 156, and the cam member 155 operates with the operation lever 156 when the operation lever 156 is operated. Specifically, when the operation lever 156 is rotated, the cam member 155 rotates about the shaft 157 extending in the direction in which the first urging member 153 and the second urging member 154 are arranged, and moves the second urging member 154 in a direction (direction in which the first urging member 153 and the second urging member 154 are arranged) perpendicular to the rotational direction (torque direction) of the operation lever 156.

The shock absorbing member 170 is a member fixed to the housing 130. The shock absorbing member 170 fixes the second engagement member 152 with respect to the housing 130 in the axial direction of the inner tube 120 during normal use. In the event of a secondary collision, the second engagement member 152 moves with respect to the housing 130 when the inner tube 120 is pressed into the housing 130. As a result, the shock absorbing member 170 deforms and absorbs the shock of the secondary collision. In the second embodiment, the shock absorbing member 170 is a rod member bent in an M-shape. The shock absorbing member 170 has its both ends fixed to the housing 130 and its middle part fitted in the engagement groove 166 of the second engagement member 152.

Figure 12:
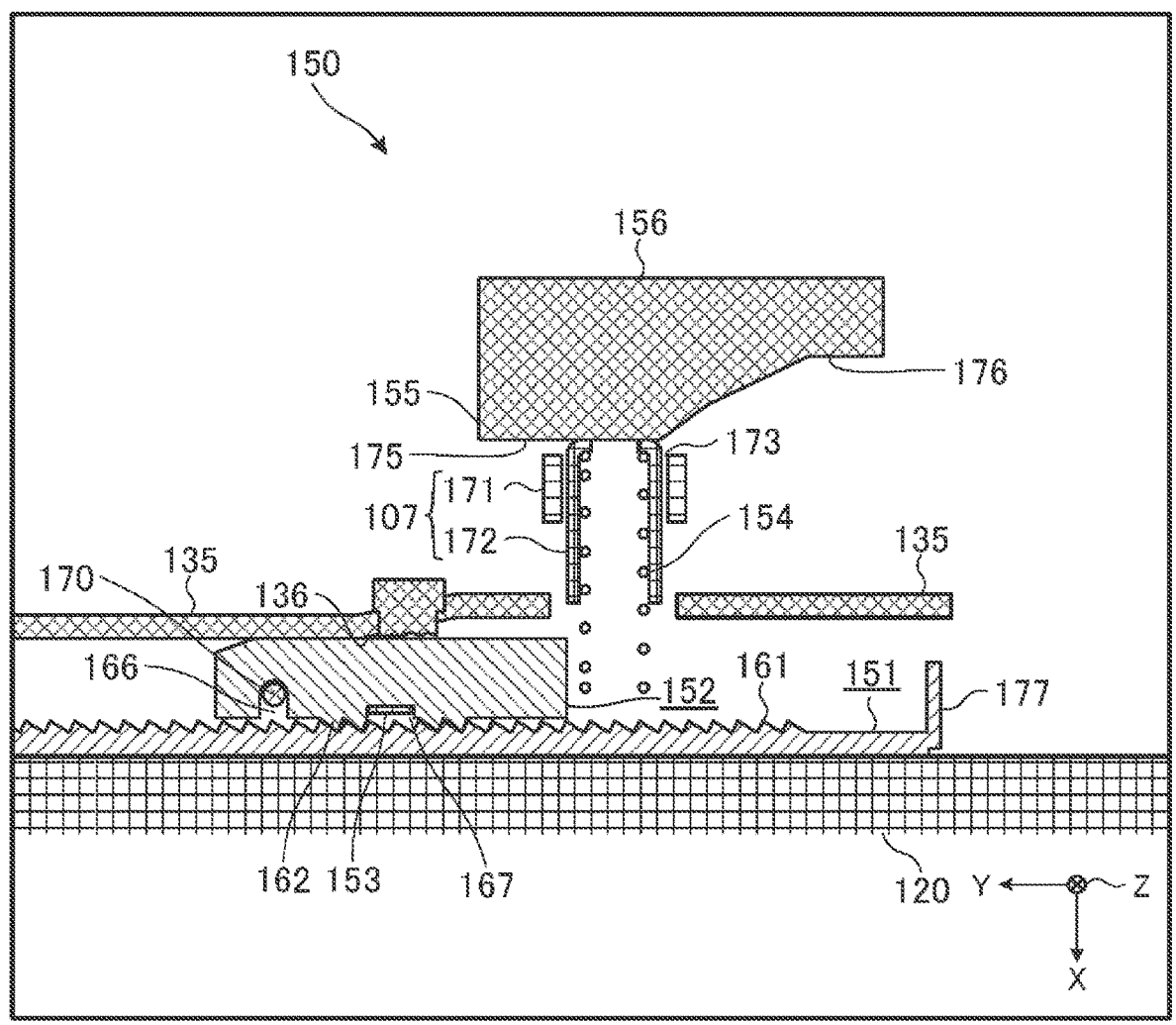
FIG. 12 is a sectional view of the lock mechanism, engagement members, etc. upon a secondary collision according to the second embodiment.

The maintaining member 135 is a member that maintains the second engagement member 152 at a position where the first teeth 161 and the second teeth 162 mesh with each other when a secondary collision occurs and the second engagement member 152 moves, while deforming the shock absorbing member 170, to a position where the second engagement member 152 is not pressed by the second urging member 154 that is a part of the pressing mechanism 105 as shown in FIG. 12. In the second embodiment, the maintaining member 135 is a sheet metal attached to the housing 130 and closing at least a part of the second slit 132. The maintaining member 135 is disposed to extend from a position at which it covers the second engagement member 152 during normal use before a secondary collision occurs, to a position to which the second engagement member 152 is moved in the axial direction when the secondary collision occurs. In other words, the maintaining member 135 is disposed to extend in the axial direction of the inner tube 120 such that it covers the second engagement member 152 during normal use before a secondary collision occurs and that it still covers the second engagement member 152 when the second engagement member 152 is located at a position to which the second engagement member 152 is moved in the axial direction when the secondary collision occurs. The distance from the part of the maintaining member 135 that covers the second engagement member 152 during normal use to the first engagement member 151 is such a distance that the second engagement member 152 can move to the position where the first teeth 161 and the second teeth 162 do not mesh with each other. The distance from the part of the maintaining member 135 along which the second engagement member 152 passes when a secondary collision occurs to the first engagement member 151 is such a distance that the second engagement member 152 can move with the first engagement member 151 with the first teeth 161 and the second teeth 162 meshing with each other.

The maintaining member 135 has a tilted portion 136 between the part of the maintaining member 135 that covers the second engagement member 152 during normal use and the part of the maintaining member 135 along which the second engagement member 152 passes when a secondary collision occurs. The tilted portion 136 allows the second engagement member 152 to smoothly move in the event of a secondary collision. The second engagement member 152 has a tapered portion corresponding to the tilted portion 136 at its end. As the tilted portion 136 of the maintaining member 135 contacts the tapered portion of the second engagement member 152, the second engagement member 152 can more smoothly move in the event of a secondary collision.

In the second embodiment, the maintaining member 135 includes a restricting portion 137. When the lock mechanism 150 is in the unlock state during normal use, the restricting portion 137 restricts movement of the second engagement member 152 by contacting the opposite end of the second engagement member 152 from the steering member in the axial direction of the inner tube 120.

Since the first engagement member 151 has the contact portion 177 and the maintaining member 135 has the restricting portion 137, so-called short end restriction is implemented. More specifically, when the driver switches the lock mechanism 150 to the unlock state and presses the steering member toward the front of the vehicle in order to adjust the position of the steering member, the steering member is restricted from being further pressed toward the front of the vehicle when the contact portion 177 contacts the restricting portion 137 with the second engagement member 152 interposed therebetween as shown in FIG. 11. Since the short end restricting structure and the lock mechanism 150 have common components, the number of components can be reduced.

In the second embodiment, the restricting portion 137 is a member separate from the maintaining member 135 and is made of resin. When a secondary collision occurs, the second engagement member 152 moves while breaking the restricting portion 137 made of resin. The restricting portion 137 can thus function as a shock absorbing member that absorbs the shock caused in the initial stage of the secondary collision by breaking. The restricting portion 137 may be integral with the maintaining member 135.

Next, operation of the steering column device 100 will be described. As shown in FIGS. 10 and 11, during normal use, the second engagement member 152 moves linearly between the maintaining member 135 and the first engagement member 151, and the lock mechanism 150 is switched between the lock state in which movement of the inner tube 120 with respect to the housing 130 is not allowed and the unlock state in which movement of the inner tube 120 with respect to the housing 130 is allowed. Specifically, when the close surface 175 of the cam member 155, the second urging member 154, the second engagement member 152, and the first urging member 153 are in one line, the close surface 175 of the cam member 155 presses the second urging member 154 toward the first urging member 153. As a result, the urging force of the second urging member 154 becomes greater than the urging force of the first urging member 153, and the first teeth 161 of the first engagement member 151 and the second teeth 162 of the second engagement member 152 mesh with each other. The lock mechanism 150 is thus switched to the lock state. Movement of the second urging member 154 is guided by the guide mechanism 107 in the direction in which the first urging member 153 and the second urging member 154 are arranged. The urging axis of the second urging member 154 that is a coil spring is aligned with the direction in which the first urging member 153 and the second urging member 154 are arranged, by the tubular holding element 172. The holding element 172 is not in contact with the second engagement member 152.

Next, the driver, etc. rotates the operation lever 156 about the shaft 157 so that the far surface 176 of the cam member 155 that rotates with the operation lever 156 is located in one line with the second urging member 154, the second engagement member 152, and the first urging member 153. In this state as well, the far surface 176 of the cam member 155 presses the second urging member 154 toward the first urging member 153. However, the second urging member 154 moves in a direction away from the first engagement member 151, and the second urging member 154 is therefore expanded to a relatively large extent. As a result, the urging force of the second urging member 154 becomes smaller than the urging force of the first urging member 153. The second engagement member 152 is therefore lifted by the urging force of the first urging member 153, and the first teeth 161 of the first engagement member 151 are disengaged from the second teeth 162 of the second engagement member 152.

Since the steering column device 100 includes the lock mechanism 150 having the above structure, it is possible to reduce the overall size of the steering column device 100 (i.e., the size of the steering column device 100 in the radial direction of the inner tube 120), and it is possible to improve flexibility in the attachment position at which the steering column device 100 is attached in the vehicle body, and flexibility in the attitude of the steering column device 100 in the vehicle body.

When a secondary collision occurs, the second engagement member 152 moves with the first engagement member 151 toward the front of the vehicle while deforming the shock absorbing member 170. When the second engagement member 152 moves further toward the front of the vehicle, the second engagement member 152 goes under the maintaining member 135 as shown in FIG. 12. In this state, the first engagement member 151 and the second teeth 162 are kept engaged even without the pressing force of the second urging member 154. Accordingly, the second engagement member 152 moves with the first engagement member 151 and the inner tube 120 while deforming the shock absorbing member 170, and the shock of the secondary collision can thus be absorbed. Moreover, since the lock mechanism 150 and the shock absorbing mechanism have common components, the total number of components of the steering column device 100 can be reduced.

A third embodiment of the steering column device 100 will be described. Components (portions) having effects and functions similar to those of the second embodiment and having shapes, mechanisms, and structures similar to those of the second embodiment are denoted with the same signs, and description thereof may be omitted. The differences from the second embodiment will be mainly described, and repetitive description may be omitted.

Figure 14:
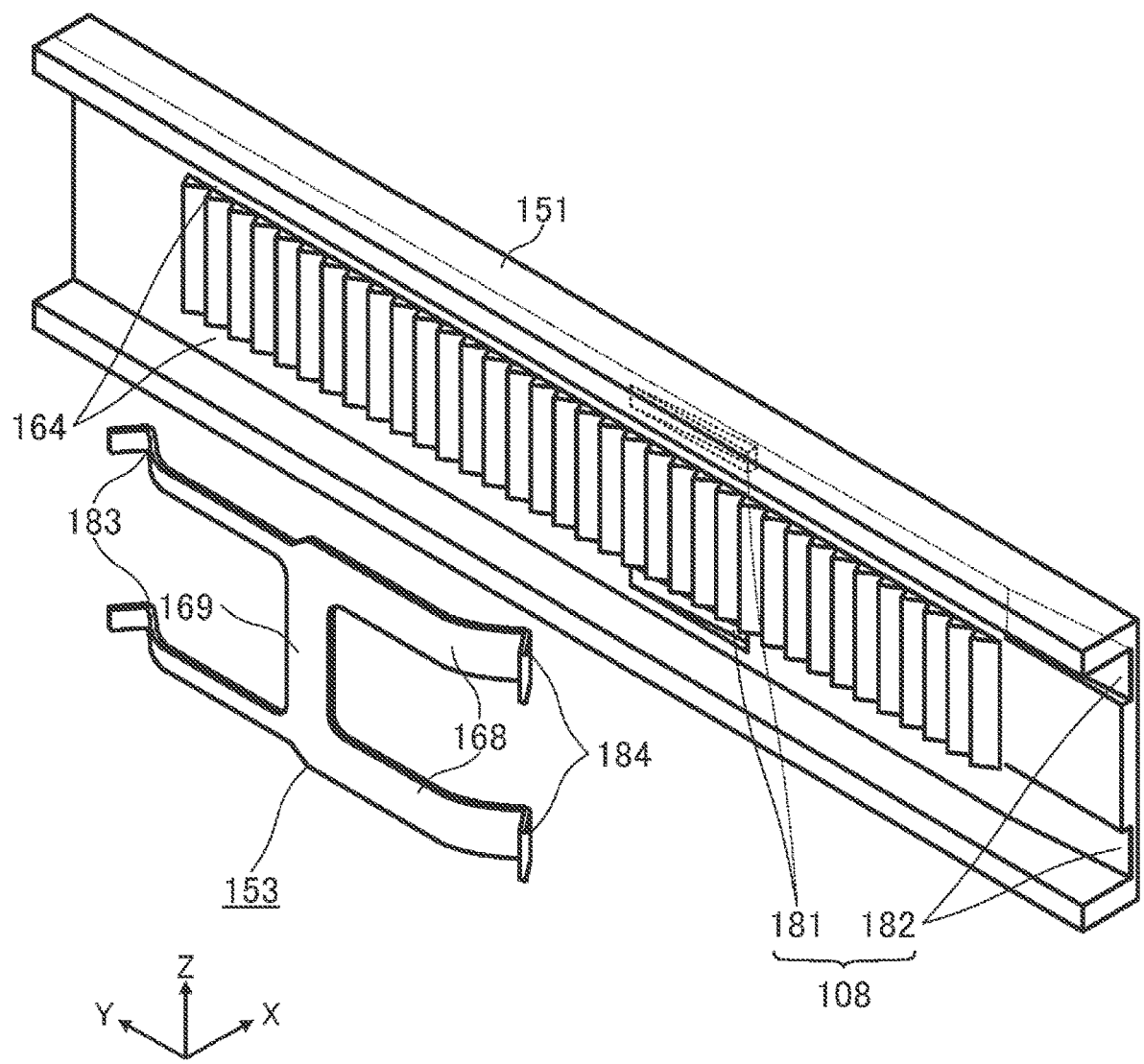
FIG. 14 is a perspective view of a first urging member and a first engagement member according to a third embodiment.

FIG. 14 is a perspective view of the first engagement member 151 and the first urging member 153 according to the third embodiment. As shown in the figure, the first engagement member 151 has the slide portions 164. When the lock mechanism 150 is in the unlock state in which the second engagement member 152 is separated from the first engagement member 151, the slide portions 164 slide on the first urging member 153 when the inner tube 120 moves with respect to the housing 130. In the third embodiment, the first engagement member 151 has the slide portions 164 respectively located on both sides of the first teeth 161, and each of the slide portions 164 has a strip shape and extends in the axial direction.

Figure 15:
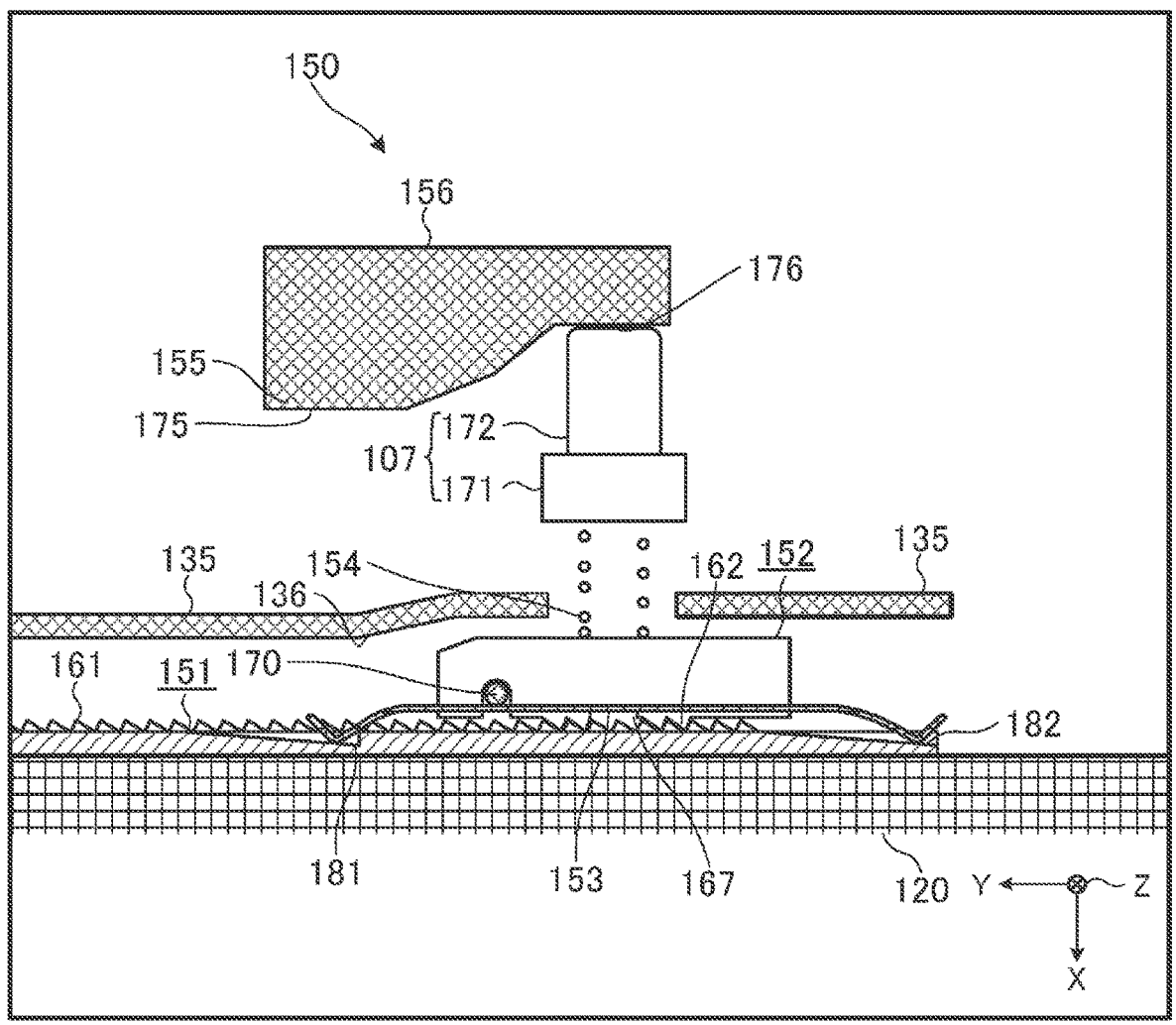
FIG. 15 is a sectional view of a lock mechanism in a short end restricted state according to the third embodiment.

The first engagement member 151 has the recesses 108 in the ends at the steering member-side (negative side of the Y axis in the figure) of the slide portions 164 (i.e., the ends of the slide portions 164, the ends being located on the side of the steering member). The recesses 108 allow the first urging member 153 to move toward the inner tube 120 (toward the positive side of the X axis in the figure) when a part of the first urging member 153 enters the recesses 108. As shown in FIG. 15, when the first urging member 153 is located in the recesses 108 while the lock mechanism 150 is in the unlock state, the urging force of the second urging member 154 that urges the second engagement member 152 toward the first engagement member 151 becomes greater than the urging force of the first urging member 153, and thus, the first teeth 161 and the second teeth 162 mesh with each other. Movement of the inner tube 120 with respect to the housing 130 can thus be restricted.

In the third embodiment, the recesses 108 are formed in each of the two slide portions 164 so as to correspond to the shape of the first urging member 153. The recesses 108 include first recesses 181 and second recesses 182. The first recesses 181 and the second recesses 182 are arranged in the axial direction of the inner tube 120 (Y-axis direction in the figure). The second recesses 182 are formed at a position closer to the steering member than the first recesses 181 are. The width of each first recess 181 in a direction perpendicular to the axial direction of the inner tube 120, namely in the width direction of the first engagement member 151 is smaller than the width of each second recess 182 in the direction perpendicular to the axial direction of the inner tube 120. As in the second embodiment, the first urging member 153 has an H-shape as viewed in plan and includes first contact portions 183 and second contact portions 184. The first contact portions 183 and the second contact portions 184 are arranged in the axial direction and contact the slide portions 164. The second contact portions 184 are located at a position closer to the steering member than the first contact portions 183 are. The width of each second contact portion 184 is larger than the width of each first recess 181 and smaller than the width of each second recess 182. The width of each first contact portion 183 is smaller than the width of each first recess 181. This configuration allows the second contact portions 184 to pass over the first recesses 181 without entering the first recesses 181. The first contact portions 183 and the second contact portions 184 can thus enter the first recesses 181 and the second recesses 182 at the same time, respectively. The first urging member 153 can therefore move in parallel with the first engagement member 151, and the second engagement member 152 can be moved toward the first engagement member 151 without being tilted.

In the steering column device 100 according to the third embodiment, since the first engagement member 151 has the recesses 108, the short end of the inner tube 120 is restricted by the components of the lock mechanism 150. The total number of components of the steering column device 100 can thus be reduced.

What is claimed is:

1. A steering column device comprising:
an inner tube having a tubular shape and configured to hold a column shaft connected to a steering member such that the column shaft is rotatable;
a housing configured to hold the inner tube such that the inner tube is movable in an axial direction of the inner tube; and
a lock mechanism configured to restrict movement of the inner tube with respect to the housing at a plurality of positions, wherein
the lock mechanism includes
a first engagement member fixedly provided on an outer peripheral surface of the inner tube and having a plurality of first teeth arranged in the axial direction of the inner tube,
a second engagement member fixed with respect to the housing in the axial direction, the second engagement member being configured to be brought into contact with and separated from the first engagement member in a radial direction of the inner tube, and having second teeth that mesh with the first teeth,
a first urging member configured to urge the second engagement member outward from the inner tube in the radial direction,
a second urging member disposed in one line with the second engagement member and the first urging member and configured to urge the second engagement member in a direction opposite to a direction of an urging force of the first urging member,
a cam member configured to rotate about a rotation axis extending in a direction in which the first urging member and the second urging member are arranged such that the second urging member serving as a follower is moved in the direction in which the first urging member and the second urging member are arranged to change a magnitude relationship between the urging force of the first urging member and an urging force of the second urging member,
an operation lever configured to operate the cam member, and
the second engagement member is configured with a holding groove in a surface thereof facing the first engagement member, the holding groove being configured to hold the first urging member.

2. The steering column device according to claim 1, wherein:
the second urging member is a spring that expands and contracts in the direction in which the first urging member and the second urging member are arranged; and
the steering column device further includes a guide mechanism fixed with respect to the housing and configured to guide expansion and contraction of the second urging member and movement of the second urging member in the direction in which the first urging member and the second urging member are arranged.

3. The steering column device according to claim 1, further comprising
a shock absorbing member fixed to the housing and configured to deform when the inner tube is pressed into the housing upon a secondary collision and absorb shock by deformation, wherein the second engagement member is fixed to the housing via the shock absorbing member and is movable with respect to the shock absorbing member in the radial direction of the inner tube.

4. The steering column device according to claim 1, wherein:
the first engagement member includes a slide portion configured to slide on the first urging member when the inner tube moves with the second engagement member being separated from the first engagement member;
the slide portion has a recess in an end of the slide portion, the end being located on a side of the steering member, and the recess allows the first urging member to move toward the inner tube when a part of the first urging member enters the recess; and
when the first urging member is located in the recess, the urging force of the second urging member is greater than the urging force of the first urging member.

5. A steering column device, comprising:
an inner tube having a tubular shape and configured to hold a column shaft connected to a steering member such that the column shaft is rotatable;
a housing configured to hold the inner tube such that the inner tube is movable in an axial direction of the inner tube; and
a lock mechanism configured to restrict movement of the inner tube with respect to the housing at a plurality of positions, wherein
the lock mechanism includes
a first engagement member fixedly provided on an outer peripheral surface of the inner tube and having a plurality of first teeth arranged in the axial direction of the inner tube,
a second engagement member fixed with respect to the housing in the axial direction via a shock absorbing member, the second engagement member being configured to be brought into contact with and separated from the first engagement member, and having second teeth that mesh with the first teeth,
a first urging member configured to urge the second engagement member outward from the inner tube,
a pressing mechanism configured to press the second engagement member toward the first engagement member against an urging force of the first urging member so as to cause the first teeth and the second teeth to mesh with each other, and
a maintaining member configured to maintain the second engagement member at a position where the first teeth and the second teeth mesh with each other when a secondary collision occurs and the second engagement member moves, while deforming the shock absorbing member, to a position where the second engagement member is not pressed by the pressing mechanism,
the second engagement member is configured with a holding groove in a surface thereof facing the first engagement member, the holding groove being configured to hold the first urging member.

6. The steering column device according to claim 5, wherein:
the maintaining member includes a restricting portion configured to restrict movement of the second engagement member by contacting one end of the second engagement member in the axial direction of the inner tube, when the second engagement member is separated from the first engagement member; and
the first engagement member includes a contact portion that protrudes to such a position that the contact portion contacts an opposite end of the second engagement member from the restricting portion when the second engagement member is separated from the first engagement member.

7. The steering column device according to claim 5, wherein:

the pressing mechanism includes a second urging member configured to press the second engagement member against the urging force of the first urging member;

the first engagement member includes a slide portion configured to slide on the first urging member when the inner tube moves with respect to the housing with the second engagement member being separated from the first engagement member, and a recess located in an end of the slide portion, the end being located on a side of the steering member, and the recess being configured to allow the first urging member to move toward the inner tube when a part of the first urging member enters the recess; and when the first urging member is located in the recess, an urging force of the second urging member is greater than the urging force of the first urging member, and the first teeth and the second teeth mesh with each other.

8. The steering column device according to claim 7, wherein:

the first engagement member includes a first recess and a second recess, the first recess and the second recess being arranged in the axial direction of the inner tube;

a width of the first recess in a direction perpendicular to the axial direction is smaller than a width of the second recess in the direction perpendicular to the axial direction, the second recess being located closer to the steering member than the first recess is;

the first urging member includes a first contact portion and a second contact portion, the first contact portion and the second contact portion being arranged in the axial direction and configured to contact the slide portion;

a width of the second contact portion is larger than the width of the first recess, and smaller than the width of the second recess, the second contact portion being located closer to the steering member than the first contact portion is; and a width of the first contact portion is smaller than the width of the first recess.

* * * * *